United States Patent
V et al.

(10) Patent No.: US 12,544,151 B2
(45) Date of Patent: Feb. 10, 2026

(54) VIRTUAL FIDUCIAL MARKINGS FOR AUTOMATED PLANNING IN MEDICAL IMAGING

(71) Applicant: KONINKLIJKE PHILIPS N.V., Eindhoven (NL)

(72) Inventors: Manikanda Krishnan V, Bangalore (IN); Srinivasa Rao Kundeti, Movva (IN); Sumit Sharma, Bangalore (IN)

(73) Assignee: Koninklijke Philips N.V., Eindhoven (NL)

( * ) Notice: Subject to any disclaimer, the term of this patent is extended or adjusted under 35 U.S.C. 154(b) by 307 days.

(21) Appl. No.: 18/286,156

(22) PCT Filed: Mar. 30, 2022

(86) PCT No.: PCT/EP2022/058421
§ 371 (c)(1),
(2) Date: Oct. 9, 2023

(87) PCT Pub. No.: WO2022/218707
PCT Pub. Date: Oct. 20, 2022

(65) Prior Publication Data
US 2024/0189041 A1    Jun. 13, 2024

(30) Foreign Application Priority Data
Apr. 13, 2021 (EP) ........................ 21168111

(51) Int. Cl.
*A61B 34/20* (2016.01)
*A61B 90/00* (2016.01)

(52) U.S. Cl.
CPC .............. *A61B 34/20* (2016.02); *A61B 90/39* (2016.02); *A61B 2034/2057* (2016.02); *A61B 2090/3966* (2016.02)

(58) Field of Classification Search
CPC . A61B 34/20; A61B 90/39; A61B 2034/2057; A61B 2090/3966
(Continued)

(56) References Cited

U.S. PATENT DOCUMENTS 5,662,111 A     9/1997  Cosman
9,734,589 B2 *  8/2017  Yu ........................... G06T 7/248
(Continued)

FOREIGN PATENT DOCUMENTS

WO    2009129457 A2    10/2009
WO    2017165835 A1    9/2017

OTHER PUBLICATIONS

International Search Report and Written Opinion from PCT/EP2022/058421 mailed Jul. 5, 2022.
(Continued)

*Primary Examiner* — Allen H Nguyen

(57) ABSTRACT

Disclosed herein is a medical system (100, 300, 500, 600) comprising: a medical imaging system (102, 302) configured to acquire medical imaging data (136) descriptive of a subject (110); a camera system (114) configured to acquire a subject image (138) of the subject; a memory (126) storing machine executable instructions (130), medical imaging system commands (134), and a coordinate system mapping, and an image marking neural network (132). Execution of the machine executable instruction by a computational system (120) causes the computational system to: acquire (200) the medical imaging data by controlling the medical imaging system with the medical imaging system commands; repeatedly (202) control the camera system to acquire the subject image during acquisition of the medical imaging data; repeatedly (204) receive camera system coordinates (142) of the virtual fiducial markers by inputting the subject image into the image marking neural network; and repeatedly (206) provide imaging system coordinates of the set of virtual
(Continued)

fiducial markers by repeatedly converting the camera system coordinates of the virtual fiducial markers to the provided imaging system coordinates of the virtual fiducial markers using the coordinate system mapping.

15 Claims, 13 Drawing Sheets

(58) Field of Classification Search
USPC .......................................................... 382/128
See application file for complete search history.

(56) References Cited

U.S. PATENT DOCUMENTS

| | | | | |
|---|---|---|---|---|
| 11,638,613 | B2* | 5/2023 | Murphy | A61B 90/36 600/407 |
| 11,983,800 | B2 | 5/2024 | Vahala | |
| 2011/0112398 | A1* | 5/2011 | Zarkh | A61B 6/503 604/529 |
| 2017/0372155 | A1 | 12/2017 | Odry et al. | |
| 2018/0068441 | A1 | 3/2018 | Yu et al. | |
| 2018/0356482 | A1 | 12/2018 | Kaufholz et al. | |
| 2020/0051239 | A1 | 2/2020 | Braun et al. | |
| 2020/0279640 | A1 | 9/2020 | Amthor et al. | |
| 2023/0026489 | A1* | 1/2023 | Poltaretskyi | A61B 90/39 |
| 2023/0165649 | A1* | 6/2023 | Fitzsimons | A61B 34/30 700/245 |
| 2023/0263573 | A1* | 8/2023 | Bakhishev | G06T 11/60 382/128 |

OTHER PUBLICATIONS

Slipsager Jakob M. et al: "Marker less motion tracking and correction for PET, MRI, and simultaneous PET/MRI", Apr. 19, 2019 (Apr. 19, 2019), pp. 1-17.
Frosio et al "A Neural Network Based Method for Optical Patient Set-up Registration in Breast Radiotherapy" Annals of Biomedical Engineering, vol. 34, No. 4, Feb. 16, 2006 p. 677-686.
Kyme et al "Marker Free Optical Stereo Motion Tracking for in-bore MRI and PET-MRI Application" Medical Physics, vol. 47, No. 8 Jun. 1, 2020 p. 3321-3331.
Kyme et al "Markerless Motion Tracking of Awake Animals in Positron Emission Tomography" IEEE Transactions on Medical Imaging, vol. 33, No. 11 Nov. 1, 2014 p. 2180-2190.
Kyme et al "Markerless Motion Estimation for Motion Compensated Clinical Brain Imaging" 2018 Phys. Med. Biol. 63 105018.
Tami Freeman "Markerless Tracking Monitors head Motion Brain Scans" Diagnostic Imaging Jun. 5, 2018.
Kustner et al "Retrospective Correction of Motion Affected MR Images Using Frameworks" Magnetic Resonance in Medicine, 2019 vol. 82 p. 1527-1540.
Pawar et al "Suppressing Motion Artefacts in MRI using an Inception-ResNet Network with Motion Simulation Augmentation" NMR in Biomedicine, 2019.
Armanious et al "Unsupervised Adversarial Correction of Rigid MR Motion Artifacts" Conference: 2020 IEEE 17th International Symposium on Biomedical Imaging (ISBI).
Andre JB, Bresnahan BW, Mossa-Basha M, Hoff MN, Smith CP, Anzai Y, et al. Toward quantifying the prevalence, severity, and cost associated with patient motion during clinical MR examinations. Journal of the American College of Radiology. 2015; 12(7):689-695.
Havidich JE, Beach M, Dierdorf SF, Onega T, Suresh G, Cravero JP. Preterm Versus Term Children: Analysis of Sedation/Anesthesia Adverse Events and Longitudinal Risk. Pediatrics. 2016; 137(3):1-9.
Afacan O, Erem B, Roby DP, Roth N, Roth A, Prabhu SP, et al. Evaluation of motion and its effect on brain magnetic resonance image quality in children. Pediatric radiology. 2016; 46(12):1728-1735.

Maclaren J, Herbst M, Speck O, Zaitsev M. Prospective Motion Correction in Brain Imaging: A Review. Magnetic resonance in medicine. 2013; 69(3):621-636.
Zaitsev M, Maclaren J, Herbst M. Motion Artifacts in MRI: A Complex Problem With Many Partial Solutions. Journal of Magnetic Resonance Imaging. 2015; 42(4):887-901.
Carson RE, Barker WC, Liow JS, Johnson CA. Design of a Motion-Compensation OSEM List-mode Algorithm for Resolution-Recovery Reconstruction for the HRRT. In: Nuclear Science Symposium Conference Record, 2003 IEEE. vol. 5; 2003. p. 3281-3285.
Olesen OV, Sullivan JM, Mulnix T, Paulsen RR, Hojgaard L, Roed B, et al. List-Mode PET Motion Correction Using Markerless Head Tracking: Proof-of-Concept With Acans of Human Subject. IEEE transactions on medical imaging. 2013; 32(2):200-209.
Spangler-Bickell MG, Zhou L, Kyme AZ, De Laat B, Fulton RR, Nuyts J. Optimising rigid motion compensation for small animal brain PET imaging. Physics in Medicine and Biology. 2016; 61(19):7074.
Picard Y, Thompson CJ. Motion Correction of PET Images Using Multiple Acquisition Frames. IEEE transactions on medical imaging. 1997; 16(2):137-144.
Tellmann L, Fulton R, Pietrzyk U, Nickel I, Stangier I, Winz O, et al. Concepts of Registration and Correction of Head Motion in Positron Emission Tomography. Zeitschrift fur medizinische Physik. 2006; 16(1):67-74.
Mukherjee J, Lindsay C, Mukherjee A, Olivier P, Shao L, King M, et al. Improved frame-based estimation of head motion in PET brain imaging. Medical physics. 2016; 43(5):2443-2454.
Sengupta S, Tadanki S, Gore JC, Welch EB. Prospective Real-Time Head Motion Correction Using Inductively Coupled Wireless NMR Probes. Magnetic resonance in medicine. 2014; 72(4):971-985.
Haeberlin M, Kasper L, Barmet C, Brunner DO, Dietrich BE, Gross S, et al. Real-Time Motion Correction Using Gradient Tones and Head-Mounted NMR Field Probes. Magnetic resonance in medicine. 2015; 74(3):647-660.
Ooi MB, Krueger S, Thomas WJ, Swaminathan SV, Brown TR. Prospective Real-Time Correction for Arbitrary Head Motion Using Active Markers. Magnetic resonance in medicine. 2009; 62(4):943-954.
Maclaren J, Armstrong BS, Barrows RT, Danishad K, Ernst T, Foster CL, et al. Measurement and Correction of Microscopic Head Motion during Magnetic Resonance Imaging of the Brain. PLOS one. 2012; 7(11):e48088.
Wighton et al "Slice by Slice Prospective Motion Correction in EPI Sequences" IMSRM 2014 Motion Workshop.
Todd N, Josephs O, Callaghan MF, Lutti A, Weiskopf N. Prospective motion correction of 3D echo-planar imaging data for functional MRI using optical tracking. NeuroImage. 2015; 113:1-12.
Aksoy M, Maclaren J, Bammer R. Prospective motion correction for 3D pseudo-continuous arterial spin labeling using an external optical tracking system. Magnetic Resonance Imaging. 2017; p. 44-52.
Maclaren J, Kyme A, Aksoy M, Zahneisen B, Bammer R. Markerless Optical Tracking for Motion Correction in MR and PET/MR Imaging of the Brain, Proc. Intl. Mag. Reson. Med 25 (2017).
Schleyer P, Dunn J, Reeves S, Brownings S, Marsden P, Thielemans K. Detecting and estimating head motion in brain PET acquisitions using raw time-of-flight PET data. Physics in medicine and biology. 2015; 60(16):6441-6458.
Raghunath N, Faber T, Suryanarayanan S, Votaw J. Motion correction of PET brain images through deconvolution: II. Practical implementation and algorithm optimization. Physics in Medicine and Biology. 2009; 54(3):813-829.
Miranda A, Staelens S, Stroobants S, Verhaeghe J. Markerless rat head motion tracking using structured light for brain PET imaging of unrestrained awake small animals. Physics in Medicine and Biology. 2017; 62(5):1744.
Keller SH, Hansen C, Hansen C, Andersen FL, Ladefoged C, Svarer C, et al. Motion correction in simultaneous PET/MR brain imaging using sparsely sampled MR navigators: a clinically feasible tool. EJNMMI physics. 2015; 2(1):2-14.

(56) References Cited

OTHER PUBLICATIONS

Todd N, Josephs O, Callaghan MF, Lutti A, Weiskopf N. Prospective motion correction of 3D echo-planar Imaging data for functional MRI using optical tracking. NeuroImage. 2015; 113:1-12.

* cited by examiner

VIRTUAL FIDUCIAL MARKINGS FOR AUTOMATED PLANNING IN MEDICAL IMAGING

CROSS REFERENCE TO RELATED APPLICATIONS

This application is a U.S. national phase application of International Application No. PCT/EP2022/058421 filed on Mar. 30, 2022, which claims the benefit of EP Application Ser. No. 21/168,111.9 filed on Apr. 13, 2021 and is incorporated herein by reference.

FIELD OF THE INVENTION

The invention relates to the use of fiducial markings in medical imaging.

BACKGROUND OF THE INVENTION

Various tomographic medical imaging techniques such as Magnetic Resonance Imaging (MRI), Computed Tomography, Positron Emission Tomography, and Single Photon Emission Tomography enable detailed visualization of anatomical structure of a subject. A common feature of all of these imaging modalities is that it takes a significant amount of time to acquire the medical imaging data necessary to reconstruct a medical image. During the acquisition of the medical imaging data the subject may move voluntarily or involuntarily resulting in image corruption or artifacts. The motion of the subject may be tracked to reduce the effect of the subject motion. Prospective motion correction the medical imaging system is adjusted to compensate for subject motion during the acquisition of the medical imaging data. Retrospective motion correction is another class of techniques where motion of the subject is recorded during the acquisition of the medical imaging data and the medical imaging data is corrected using this recorded subject motion to reconstruct a corrected medical image.

A well-known technique is the use of fiducial markers. A fiducial marker is a marker which is applied to the surface of a subject. In some examples, cameras can then be used to measure the location of the fiducial markers. In other examples, the location of a fiducial marker is recorded directly by the medical imaging scanner. In magnetic resonance imaging, there are fiducial markers which can be located detected directly via a magnetic resonance imaging measurement. A disadvantage of a fiducial marker is that it must be applied to the surface of subject or worn.

The journal article Slipsager, Jakob M., et al. "Markerless motion tracking and correction for PET, MRI, and simultaneous PET/MRI." Plos one 14.4 (2019): e0215524 discloses a markerless motion tracker compatible with PET, MRI, and simultaneous PET/MRI systems for motion correction (MC) of brain imaging. PET and MRI compatibility is achieved by positioning of in-bore vision extenders and by placing all electronic components out-of-bore. The motion tracker is demonstrated in a clinical setup during a pediatric PET/MRI study including 94 pediatric patient scans. PET MC is presented for two of these scans using a customized version of the Multiple Acquisition Frame method. Prospective MC of MRI acquisition of two healthy subjects is demonstrated using a motion-aware MRI sequence. Real-time motion estimates are accompanied with a tracking validity parameter to improve tracking reliability. I. Frosio et. al disclose, in 'A Neural Network Based Method for Optical Patient Set-up Registration in Breast Radiotherapy', Annals of Biomedical Engineering, vol. 34, no. 4, pages 677-686 (2006), a radiotherapy system with a motion compensation neural network algorithm that analyzes positions of markers formed by laser spots on a patient.

SUMMARY OF THE INVENTION

The invention provides for a medical system, a computer program, and a method in the independent claims. Embodiments are given in the dependent claims.

Embodiments may provide for an improved means of subject tracking during the acquisition of medical imaging data by a medical imaging system. Instead of placing fiducial markers on the surface of a subject, an image marking neural network is used to provide a set of virtual fiducial markers in the coordinate system of a camera system. A coordinate system mapping is then used to covert the location of the set of virtual fiducial markers to the coordinate system of the medical imaging system. This may have a variety of potential advantages. Firstly, the application of fiducial markers to the subject is avoided. Another potential advantage is that the large number of algorithms and techniques of using physical fiducial markers can be used with a minimum of modification. The coordinates of the virtual fiducial markers can be fed into these existing algorithms.

Another potential advantage is that prior system that use various Artificial Intelligence (AI) systems such as the Slipsinger article cited above use neural networks to directly provide a rigid body translation. This may be effective for imaging such regions as the brain where the organ is located within the skull. However, the techniques disclosed in Slipsinger may not be generally applicable to other types of imaging. Providing virtual fiducial markers instead enables more possibilities to deal with different types of motion. For example, the expansion and contraction of the chest due to respiration and heart motion by the subject can be dealt with by fiducial markers but not with a rigid body translation.

In Slipsinger et. al., the TCL2 motion tracking software package (TracSuite) estimates the patients head pose using Iterative Closest Point (ICP) algorithm. The head pose is computed at a frequency of 30 Hz, a sample rate which is sufficient for most motion correction purposes. The ICP alignment algorithm imposes the assumption of tracking a rigid surface. Occlusion, rapid motion or facial movements may violate such a rigidity assumption. Also, if the patient moves outside the Field of View (FOV), accurate tracking is not possible. Therefore, the estimated pose is analyzed against the reference point cloud in order to determine how reliable the tracking result is.

In the present invention, the virtual fiducial markers as trackers may be a variable set of markers may remove the dependency on registering the point cloud with the patient. This may have the benefit of removing the degrees of freedom dependency failures and help our system to be more robust with 3-way correction—inform patient on his movement, retrospective and prospective corrections.

In one aspect the invention provides for a medical system that comprises a medical imaging system. The medical imaging system is configured to acquire medical imaging data descriptive of a subject from an imaging zone. The medical imaging system may for example be a tomographic medical imaging system. The medical imaging system has an image system coordinate system. That is to say that data is acquired relative to a set of coordinates which belong to the medical image system. The medical system further comprises a camera system that is configured to acquire a subject image of the subject during acquisition of the medical imaging data. The camera system has a camera coordinate system.

In different examples the camera system coordinate could have different meanings depending upon the type of camera system used. The camera system could, for example, be an optical camera system or an infrared camera system. In general, the camera system can be implemented using most 3D or 2D camera systems which can be made compatible with the particular type of medical imaging system being used.

In the case of a two-dimensional camera the camera coordinates may for example by the location on the image. In other examples the camera system could be a three-dimensional camera or a stereo camera. The image within the three-dimensional image may then indicate a position in space. A stereo camera may be constructed from two two-dimensional cameras. In case the medical imaging system is a combined magnetic resonance imaging (MRI) system and position emission tomography (PET) system, the camera may also be a three-dimensional camera compatible with both magnetic resonance imaging and positron emission tomography. This may include positioning the camera so that it does not interfere with measurements made by the PET ring.

The medical system further comprises a memory storing machine-executable instructions. The memory further stores medical imaging system commands. The memory further stores a coordinate system mapping. The memory further stores an image marking neural network. The coordinate system mapping is a mapping between the system coordinate system and the camera coordinate system. This for example could be implemented in different ways in different examples. In one example it may be a lookup table or an equation to calculate between the two of them.

The image marking neural network is a neural network that is configured to receive an input image that is descriptive of a predetermined anatomical region of the subject. The image marking neural network is therefore a neural network configured for locating objects in images or for segmenting images. A variety of types of neural networks may be used. In medical imaging, neural networks with a U-net architecture are often used for image segmentation and are useful for implementing the image marking neural network.

In one example, a combination of a U-Net architecture with a key point detection neural network may be used to form a more robust prediction for the virtual fiducial markers. This network, similar to a Mask-RCNN may have 3 different blocks—segmentation, regression and keypoint position/selection (virtual fiducial marker selection). This may help to add to the additional robustness in selecting alternate points (alternative fiducial markers) in cases of patient motion, that may happen. Building this redundancy in network based on segmentation, keypoint detection and landmark identification/selection may help keep the algorithm flexible and can operate with alternate fiducial points, catering to the patient movement.

The image marking neural network is further configured to output camera system coordinates of a set of virtual fiducial markers. The coordinates of the set of virtual fiducial markers are given in terms of the input image and are produced in response to receiving the input image. In other words, the input image is input into the image marking neural network and as output the coordinates of the set of virtual fiducial markers is provided in the camera system of coordinates.

The medical imaging system commands are configured to control the medical imaging system to acquire the medical imaging data. These medical imaging system commands may for example take different forms in different examples. In the case where the medical imaging system is a magnetic resonance imaging system the medical imaging system commands may be pulse sequence commands. The medical system further comprises a computational system configured for controlling the medical system.

Execution of the machine-executable instructions causes the computational system to acquire medical imaging data by controlling the medical imaging system with the medical imaging system commands. Execution of the machine-executable instructions further causes the computational system to repeatedly control the camera system to acquire the subject image during acquisition of the medical imaging data. Execution of the machine-executable instructions further causes the computational system to repeatedly receive the camera system coordinates of the virtual fiducial markers by inputting the subject image into the image marking neural network. Execution of the machine-executable instructions further causes the computational system to repeatedly provide the imaging system coordinates of the set of virtual fiducial markers by repeatedly converting the camera system coordinates of the virtual fiducial markers to the provided imaging system coordinates of the virtual fiducial markers using the coordinate system mapping.

In other words, as the medical imaging data is acquired the camera acquires images or subject images during the acquisition of this medical imaging data. This is then input into the image marking neural network which produces the coordinates of the set of virtual fiducial markers in the coordinate system of the camera system. The coordinate system mapping is then used to convert these coordinates to the coordinate system of the medical imaging system.

The use of fiducial markers is common in various medical imaging modalities particularly in magnetic resonance imaging. A well-known disadvantage of using fiducial markers is that they need to be applied to the surface or garment of a subject being imaged and then the location of these fiducial markers needs to be detected. Embodiments may have the advantage that they are able to provide the coordinates of virtual fiducial markers in the coordinate system of the medical imaging system without the actual use of fiducial markers. This for example enables existing algorithms and programs to compensate for the motion of a subject to be used without large modification.

The virtual fiducial markers may take different forms in different examples. In one case they may be the markers which are identified as having a particular location in the image. These could be located by the image marking neural network. The term 'image marking' in image marking neural network is a label to identify a particular neural network. In one example the set of virtual fiducial markers are a set of point clouds detected around the eye contacts, lip corners or contours of a face. In other examples they may be various anatomical landmarks visible on the surface of a subject. In other examples the set of virtual fiducial markers may have their location determined by a relationship between multiple anatomical landmarks.

The image marking neural network may be trained in a variety of ways. Images of a subject may be prepared and these images may also be marked up by hand or by machine to have the position of fiducial markers indicated. The image marking neural network could then be trained using for example, a deep learning training algorithm.

In one example the neural network may be trained with existing images, based on automated-segmentation algorithm to predict the automatic 3D depth segmented labels of the organ and also in-field utilize previous similar labels. Using this segmentation as attention, it is possible to estimate the probable fiducial markers even if they are moving. A re-enforcement learning algorithm may be used to track the positions and in case a location is not provided or not found for a particular virtual fiducial maker select the alternate nearest fiducial points or markers. This 2-phased network may trained in both in the factory and in the field to enable continuous on-field learning with the site data. This for example may be applied to the U-Net architecture with a key point detection neural network described above.

The neural network can also be trained so that virtual fiducial markers have a variable behavior. For example, with physical fiducial markers as one turns one head different fiducial markers may be visible at different times. During training different views of a subject can be constructed so that at different viewing angles different virtual fiducial markers are visible. In this case the number of fiducial markers provided by the image marking neural network may be variable.

In another embodiment the set of virtual fiducial markers is a predetermined set of virtual fiducial markers. For example, instead of being a set of point clouds the virtual fiducial markers could have a predefined relationship to locations of the subject's surface anatomy. The image marking neural network could be trained by providing images of a subject that have been manually labeled by a medical technician or physician with the predetermined set of virtual fiducial markers. This would work for structures like the head as well as other anatomical structures such as the chest region of a subject.

In another embodiment execution of the machine-executable instructions further causes the computational system to receive an initial medical image prior to beginning acquisition of the medical imaging data. The initial medical image may be descriptive of an anatomical region of the subject. This could for example be the predetermined anatomical region of the subject or adjacent to or within the subject. Execution of the machine-executable instructions further causes the computational system to receive a chosen field of view identified in the initial medical image. The chosen field of view could for example be a region that is desired to be imaged by a physician. Execution of the machine-executable instructions further causes the computational system to calculate a registration between the image system coordinates of the virtual fiducial markers and the initial medical image. This then provides a reference between the imaging system coordinates and the initial medical image. This for example may be used as a means to image the chosen field of view.

Execution of the machine-executable instructions further causes the computational system to configure the pulse sequence commands to acquire the medical imaging data from the chosen field of view using the registration. This embodiment may be beneficial because the region to be imaged by the subject was determined by using the virtual fiducial markers. This may enable the acquisition of data without the use of a prior scout scan. This may provide for a reduced burden in correctly operating the medical system to acquire initial medical images such as magnetic resonance images.

In another embodiment the initial medical image is an anatomical atlas image. This embodiment may be beneficial because the physician for example may sit in her or his office and prepare an indicator region that it is desired to image to perform a diagnosis on the subject. The physician is able to do this using the anatomical atlas image and this is then translated using the registration to properly perform the imaging.

In another embodiment the initial medical image is a scout scan of the subject. This embodiment may be beneficial because the scout scan may then be used to automatically configure the medical system for acquiring the medical imaging data.

In another embodiment the medical imaging system is a magnetic resonance imaging system and the initial medical image is not a scout scan. The medical system is then implemented as a marker less and scoutless magnetic resonance imaging system.

In another embodiment the initial medical image is a prior medical image of the subject. For example, in a prior medical examination even using a different imaging modality the physician may indicate a region where it is desired to perform more or different imaging protocol. This prior medical image, even of a different imaging modality may then be registered to the fiducial markers and enable proper imaging of the chosen field of view.

In another embodiment execution of the machine-executable instructions further causes the computational system to repeatedly adjust the medical imaging system commands to acquire the medical imaging data from the chosen field of view using the registration in response to a change in the imaging system coordinates of the virtual fiducial markers. A change in the coordinates of the virtual fiducial markers may indicate that the subject has moved. By registering this to the imaging system coordinates it may be inferred how one should adjust the chosen field of view so that it is able to compensate for motion of the subject. This may be beneficial as it may reduce the effects of subject motion on the imaging process.

In another embodiment the medical imaging system commands are adjusted such that the chosen field of view matches the most recent imaging system coordinates of the virtual fiducial markers. For example, if the subject has moved the position of the chosen field of view can be modified such that it matches the most recent coordinates. This would have the effect of reducing the effects of motion on the imaging process.

In another embodiment the pulse sequence commands are adjusted such that the chosen field of view matches predicted coordinates of the imaging system coordinates of the virtual fiducial markers determined using a velocity of the imaging system coordinates of the virtual fiducial markers. For example, the position of the virtual fiducial markers can be tracked over a period of time. At a particular time, a velocity of the virtual fiducial markers can be used then to predict the position of the virtual fiducial markers in the future. This may further have the effect of reducing the effects of motion.

In another embodiment the medical system further comprises a subject-mounted gyroscope configured for providing gyroscope data descriptive of subject motion. Execution of the machine-executable instructions further causes the computational system to repeatedly receive the gyroscope data from the subject-mounted gyroscope. Execution of the machine-executable instructions further causes the computational system to repeatedly determine a subject acceleration from the gyroscope data. Execution of the machine-executable instructions further causes the computational system to repeatedly calculate a predicted virtual fiducial marker velocity using the subject acceleration. Execution of the machine-executable instructions further causes the computational system to repeatedly calculate a predicted virtual fiducial marker location using the most recent imaging system coordinates of the virtual fiducial markers and the predicted virtual fiducial marker velocity. This predicted fiducial marker velocity location may then be used to correct the position of the chosen field of view based on this estimated or predicted fiducial marker location. This may further have the effect of reducing the effects of subject motion on the image quality.

In another embodiment the medical system further comprises a display. Execution of the machine-executable instructions further causes the computational system to receive the camera system coordinates of the set of virtual fiducial markers at a beginning of the acquisition of the medical imaging data. Execution of the machine-executable instructions further causes the computational system to calculate a position of an initial subject location indicator using the camera system coordinates of the set of virtual fiducial markers at a beginning of the acquisition. Execution of the machine-executable instructions further causes the computational system to render the initial subject location indicator on the display persistently. Execution of the machine-executable instructions further causes the computational system to repeatedly calculate a position of a current location indicator using the camera system coordinates of the set of virtual fiducial markers.

One shortcoming of the system described in Slipsager et. al. is that the system it doesn't make use of this system to inform patient for his position correction, even before the scan is done, and highly depends on rigid point cloud template, which is prone to lots of failures. This embodiment may overcome this disadvantage by providing the above-mentioned display.

Execution of the machine-executable instructions further causes the computational system to repeatedly render the current subject location indicator on the display. This embodiment may be advantageous because it provides a very good visual cue or tool for one to monitor how the position of the subject is changing during the course of an examination. The initial subject location indicator shows the initial position of the subject and then the current subject location indicator represents the current position of the subject. This can be used in several different situations. The display can be provided to the subject such that the subject is able to see how the subject her or himself has moved. The display of both the current subject location indicator and the initial subject location indicator may also be an aid to a subject in repositioning themselves back to the initial position. The display can also be provided to an operator during the operation of the medical system as an aid to the operator to understand how much or how little the subject has moved during the examination.

In another embodiment the initial subject location indicator is a rendering of the set of virtual fiducial markers positioned using the output camera system coordinates at the beginning of the acquisition superimposed on the subject image. The current subject location indicator is a rendering of the set of virtual fiducial markers (the current or most recent) positioned using the camera system coordinates superimposed on the current or most recent subject image.

In another embodiment the initial subject indicator is a first object positioned using a combination of the set of virtual fiducial markers and the camera system coordinates at the beginning of the acquisition. The current subject location indicator is a second object positioned using a combination of the set of virtual fiducial markers and the camera system coordinates. In this case a variety of different objects can be positioned. For example, it does not need to be an actual image of the subject and the virtual fiducial markers. In this case it may for example be a cartoonish image generally representative of a subject. In other cases, the indicator may be an object, which is rotated and/or translated.

In another embodiment the display shows an overlay of the initial medical image or the clinical medical image along with the virtual fiducial markers. The initial medical image or the clinical medical image my for example display anatomical anomalies or abnormalities. The overlaid display may help the subject or the operator better grasp the location and extent of an abnormality if present.

In another embodiment the medical imaging data is acquired in portions. Execution of the machine-executable instructions further causes the computational system to correct each of the portions of the medical imaging data using the camera system coordinates of the virtual fiducial markers at the time each of the portions of the medical imaging data was acquired. This embodiment may be beneficial because it may provide a record for the individual portions of the medical imaging data about the position and/or movement of the subject. This may be used to retroactively correct the medical imaging data.

In another embodiment the correction to the positions of the medical imaging data are corrected using any one of the following methods: by performing a rigid body rotation and/or translation and also using a medical imaging data correcting neural network configured to output corrected medical imaging data in response to receiving one of the portions of the medical imaging data and the output coordinates of the virtual fiducial markers at the time each of the positions of the medical imaging data was acquired. In these two cases one is performed by correcting the raw medical imaging data by using translations. The neural network may also be used for this. The medical imaging data correcting neural network may be trained by taking correct medical imaging data and then dividing it into portions and simulating the effect of movement. For example, translating the measurements in k-space and/or rotating them. The reference data for the training may be used to correct images that are correct or have the correct k-space data and then use the artificially translated data for the training.

In another embodiment execution of the machine-executable instructions further causes the computational system to reconstruct a clinical medical image from the medical imaging data.

In another embodiment the medical system further comprises a radiotherapy system configured for eradiating a treatment zone. The treatment zone is within the imaging zone. Execution of the machine-executable instructions further causes the computational system to receive radiotherapy control commands configured to control the radiotherapy system to irradiate the treatment zone. Execution of the machine-executable instructions further causes the computational system to register the imaging system coordinates of the virtual fiducial markers to the clinical medical image. Execution of the machine-executable instructions further causes the computational system to receive a location of the treatment zone in the clinical medical image. Execution of the machine-executable instructions further causes the computational system to modify the radiotherapy control commands using the location of the treatment zone in the clinical medical image and the registration of the imaging system coordinates of the virtual fiducial markers to the clinical medical image. This embodiment may be beneficial because it may provide for more accurate use of a radiotherapy system. This embodiment may have the benefit that it reduces radiotherapy treatment planning setup time. It may possibly eliminate the need to do a CT and/or MRI scan for patient alignment as alignment can be done using the 3D real time camera data and previous a CT and/or MRI scan. The previous CT and/or MRI scan can be used as the initial medical image.

In another embodiment the medical imaging system is a magnetic resonance imaging system.

In another embodiment the medical imaging system is a combined positron emission tomography system and computed tomography system.

In another embodiment the medical imaging system is a positron emission tomography system.

In another embodiment the medical imaging system is a single photon emission tomography system.

In another embodiment the medical imaging system is a combined positron emission tomography and computed tomography system.

In another embodiment the medical imaging system is a combined magnetic resonance imaging and a positron emission tomography system.

In another aspect the invention provides for a method of operating the medical system. The medical system is configured to acquire medical imaging data descriptive of the subject from an imaging zone. The medical imaging system has an image system coordinate system. The medical system further comprises a camera system configured to acquire a subject image of the subject during acquisition of the medical imaging data. The camera system has a camera system coordinate system. The method comprises acquiring medical imaging data by controlling the medical imaging system with the medical imaging system commands.

The method further comprises repeatedly controlling the camera system to acquire the subject image during acquisition of the medical imaging data. The method further comprises repeatedly receiving camera system coordinates of the virtual fiducial markers by inputting the subject image into the image marking neural network. The image marking neural network is configured to receive as input an input image descriptive of a predetermined anatomical region of the subject. The image marking neural network is further configured to output camera system coordinates of the set of virtual fiducial markers as in the input image in response to receiving the input image. The method further comprises repeatedly providing imaging system coordinates of the virtual fiducial markers by repeatedly converting the camera system coordinates of the set of virtual fiducial markers to the provided image system coordinates of the virtual fiducial markers using a coordinate system mapping. The coordinate system mapping is a mapping between the system coordinate system and the camera coordinate system.

In another aspect the invention provides for a computer program comprising machine-executable instructions for execution by a computational system controlling the medical system. The medical system comprises a medical imaging system configured to acquire medical imaging data descriptive of a subject from an imaging zone. The medical imaging system has an image system coordinate system. The medical system further comprises a camera system configured to acquire a subject image of a subject during acquisition of the medical imaging data. The camera system has a camera coordinate system. The computer program may also comprise the image marking neural network, the medical imaging system commands, and/or the coordinate system mapping.

Execution of the machine-executable instructions causes the computational system to acquire medical imaging data by controlling the medical imaging system with the medical imaging system commands. Execution of the machine-executable instructions further causes the computational system to repeatedly control the camera system to acquire the subject image during acquisition of the medical imaging data. Execution of the machine-executable instructions further causes the computational system to repeatedly receive camera system coordinates of the virtual fiducial markers by inputting the subject image into the image marking neural network. The image marking neural network is configured to receive an input image descriptive of a predetermined anatomical region of a subject. The image marking neural network is further configured to output camera system coordinates of the virtual fiducial markers in the input image in response to receiving the input image.

Execution of the machine-executable instructions further causes the computational system to repeatedly provide imaging system coordinates of the virtual fiducial markers by repeatedly converting the camera system coordinates of the set of virtual fiducial markers to the provided imaging system coordinates of the virtual fiducial markers using a coordinate system mapping. The coordinate system mapping is a map between the imaging system coordinate system and the camera coordinate system.

It is understood that one or more of the aforementioned embodiments of the invention may be combined as long as the combined embodiments are not mutually exclusive.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor or computational system of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the computational system of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the computational system. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example, data may be retrieved over a modem, over the internet, or over a local area network. Computer executable code embodied on a computer readable medium may be transmitted using any appropriate medium, including but not limited to wireless, wire line, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a computational system. 'Computer storage' or 'storage' is a further example of a computer-readable storage medium. Computer storage is any non-volatile computer-readable storage medium. In some embodiments computer storage may also be computer memory or vice versa.

A 'computational system' as used herein encompasses an electronic component which is able to execute a program or machine executable instruction or computer executable code. References to the computational system comprising the example of "a computational system" should be interpreted as possibly containing more than one computational system or processing core. The computational system may for instance be a multi-core processor. A computational system may also refer to a collection of computational systems within a single computer system or distributed amongst multiple computer systems. The term computational system should also be interpreted to possibly refer to a collection or network of computing devices each comprising a processor or computational systems. The machine executable code or instructions may be executed by multiple computational systems or processors that may be within the same computing device or which may even be distributed across multiple computing devices.

Machine executable instructions or computer executable code may comprise instructions or a program which causes a processor or other computational system to perform an aspect of the present invention. Computer executable code for carrying out operations for aspects of the present invention may be written in any combination of one or more programming languages, including an object-oriented programming language such as Java, Python, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly. In other instances, the machine executable instructions or computer executable code may be in the form of programming for programmable logic gate arrays.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It is understood that each block or a portion of the blocks of the flowchart, illustrations, and/or block diagrams, can be implemented by computer program instructions in form of computer executable code when applicable. It is further under stood that, when not mutually exclusive, combinations of blocks in different flowcharts, illustrations, and/or block diagrams may be combined. These computer program instructions may be provided to a computational system of a general purpose computer, special purpose computer, or other programmable data processing apparatus to produce a machine, such that the instructions, which execute via the computational system of the computer or other programmable data processing apparatus, create means for implementing the functions/acts specified in the flowchart and/or block diagram block or blocks.

These machine executable instructions or computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The machine executable instructions or computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A 'user interface' as used herein is an interface which allows a user or operator to interact with a computer or computer system. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer to indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, pedals, wired glove, remote control, and accelerometer are all examples of user interface components which enable the receiving of information or data from an operator.

A 'hardware interface' as used herein encompasses an interface which enables the computational system of a computer system to interact with and/or control an external computing device and/or apparatus. A hardware interface may allow a computational system to send control signals or instructions to an external computing device and/or apparatus. A hardware interface may also enable a computational system to exchange data with an external computing device and/or apparatus. Examples of a hardware interface include, but are not limited to: a universal serial bus, IEEE 1394 port, parallel port, IEEE 1284 port, serial port, RS-232 port, IEEE-488 port, Bluetooth connection, Wireless local area network connection, TCP/IP connection, Ethernet connection, control voltage interface, MIDI interface, analog input interface, and digital input interface.

A 'display' or 'display device' as used herein encompasses an output device or a user interface adapted for displaying images or data. A display may output visual, audio, and or tactile data. Examples of a display include, but are not limited to: a computer monitor, a television screen, a touch screen, tactile electronic display, Braille screen, Cathode ray tube (CRT), Storage tube, Bi-stable display, Electronic paper, Vector display, Flat panel display, Vacuum fluorescent display (VF), Light-emitting diode (LED) displays, Electroluminescent display (ELD), Plasma display panels (PDP), Liquid crystal display (LCD), Organic light-emitting diode displays (OLED), a projector, and Head-mounted display.

Medical imaging data is defined herein as being recorded measurements made by a medical imaging system descriptive of a subject. The medical imaging data may be reconstructed into a medical image which may be referred to a clinical medical image. A medical image is defined herein as being the reconstructed two- or three-dimensional visualization of anatomic data contained within the medical imaging data. This visualization can be performed using a computer.

K-space data is defined herein as being the recorded measurements of radio frequency signals emitted by atomic spins using the antenna of a Magnetic resonance apparatus during a magnetic resonance imaging scan. K-space is an example of medical imaging data.

A Magnetic Resonance Imaging (MRI) image or MR image is defined herein as being the reconstructed two- or three-dimensional visualization of anatomic data contained within the magnetic resonance imaging data. This visualization can be performed using a computer.

BRIEF DESCRIPTION OF THE DRAWINGS

In the following preferred embodiments of the invention will be described, by way of example only, and with reference to the drawings in which.

DESCRIPTION OF EMBODIMENTS

Like numbered elements in these figures are either equivalent elements or perform the same function. Elements which have been discussed previously will not necessarily be discussed in later figures if the function is equivalent.

Figure 1:
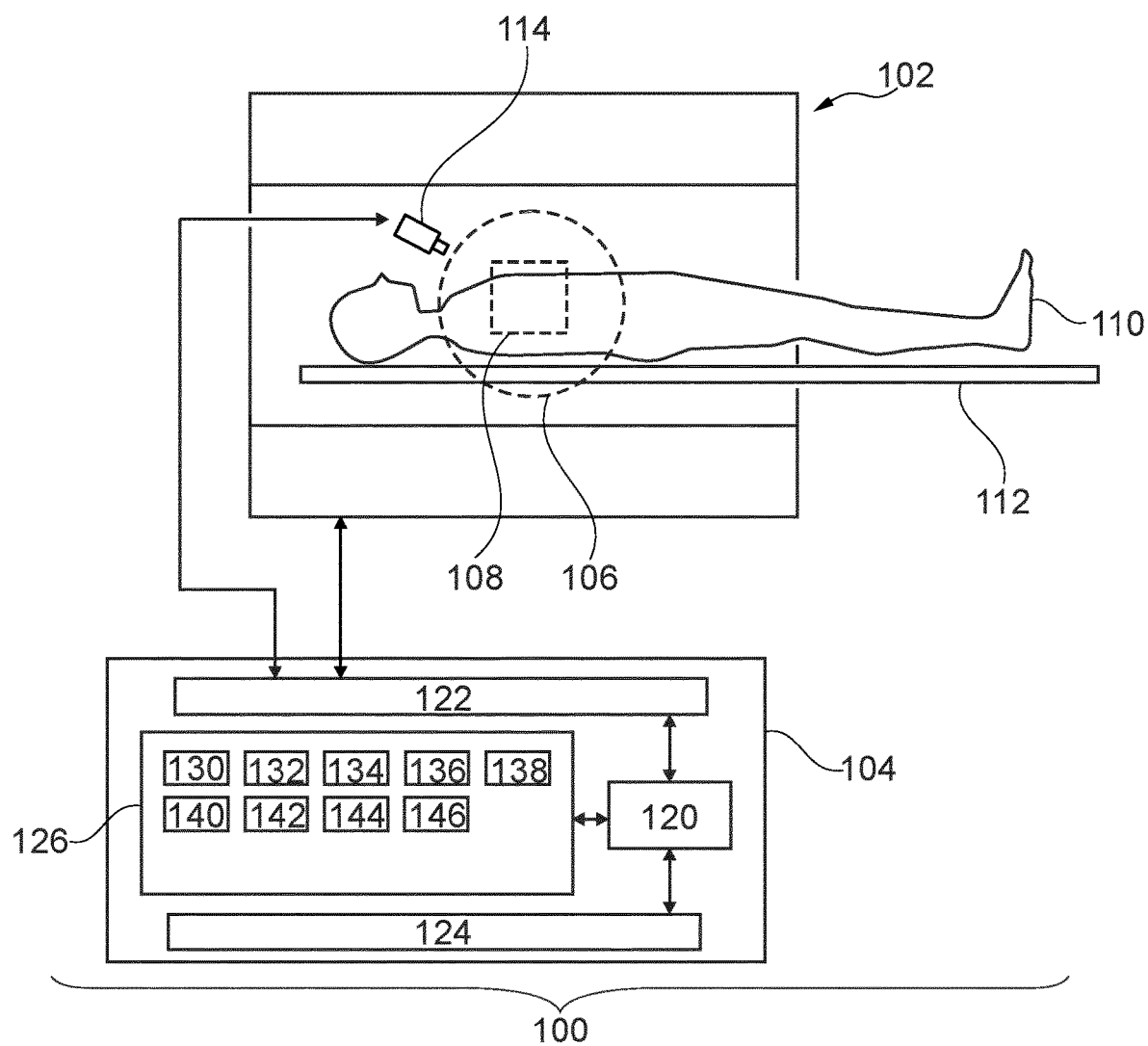
FIG. 1 illustrates an example of a medical system.

FIG. 1 illustrates an example of a medical system 100. The medical system 100 is shown as comprising a medical imaging system 102 and a computer 104. The computer 104 is intended to represent one or more computers located at one or more locations or distributed. The medical imaging system 102 is intended to be representative of different types of medical imaging systems. The medical imaging system could for example be a magnetic resonance imaging system, a positron emission tomography system, a single photon emission tomography system, a combined positron emission tomography and computed tomography system, and a combined magnetic resonance imaging and positron emission tomography system. The medical imaging system 102 has an imaging zone 106 where it is possible to acquire medical imaging data to image a subject 110. The subject 110 is shown as reposing on a subject support 112 and is at least partially within the imaging zone 106. In this example the medical imaging system 102 has a controllable field of view 108. A camera system 114 within the medical imaging system 102 images an anatomical region of the subject 110. In this example it is the chest region.

The computer 104 is shown as comprising a computational system 120. The computational system 120 is intended to represent one or more processing cores or computational systems located at one or more locations. For example, the computer can be integrated into the medical imaging system or it could be located in a detachable fashion. For example, it could be implemented such that it can be integrated with existing motion detection and correction systems as a plug-and-play interface.

The computational system 120 is shown as being in communication with a hardware interface 122, an optional user interface 124 and a memory 126.

The memory 126 is shown as containing machine-executable instructions 130. The machine-executable instructions 130 are used by the computational system 120 and enable it to perform various control and data processing and image processing tasks. The memory 126 is further shown as containing an image marking neural network 132. The image marking neural network 132 receives a subject image 138 and outputs a set of coordinates for a set of virtual fiducial markers in the coordinates of the camera system 114.

The memory 126 is further shown as containing a set of medical imaging system commands 134. The medical imaging system commands 134 are a set of commands which are used by the computational system 120 to control the medical imaging system 102 to acquire medical imaging data 136. In the case of the medical imaging system 102 being a magnetic resonance imaging system the medical imaging system commands 134 would be pulse sequence commands and the medical imaging data 136 would be k-space data.

The memory 126 is further shown as containing the subject image 138 that has been acquired with the camera system 114. The memory 126 is further shown as containing a coordinate system mapping 140 that is able to map coordinates in the camera coordinate system to that of the coordinate system of the medical imaging system 102. The memory 126 is further shown as containing a set of camera system coordinates of the set of virtual fiducial markers 142 that were received from the image marking neural network 132 in response to receiving the subject image 138 as input. The memory 126 is further shown as containing an image system coordinates of the set of virtual fiducial markers 144 that was calculated by converting the camera system coordinates of the set of virtual fiducial markers 142 using the coordinate system mapping 140. The memory 146 is further shown as containing a clinical image 146 that was reconstructed from the medical imaging data 136. The system coordinates of the set of virtual fiducial markers 144 may for example be used for improving the quality of the clinical image 146 in several different ways. It may be used for modifying the acquisition of the medical imaging data 136 by tracking motion of the subject 110 and it may also be used for retroactively correcting the clinical image 146 during reconstruction.

Figure 2:
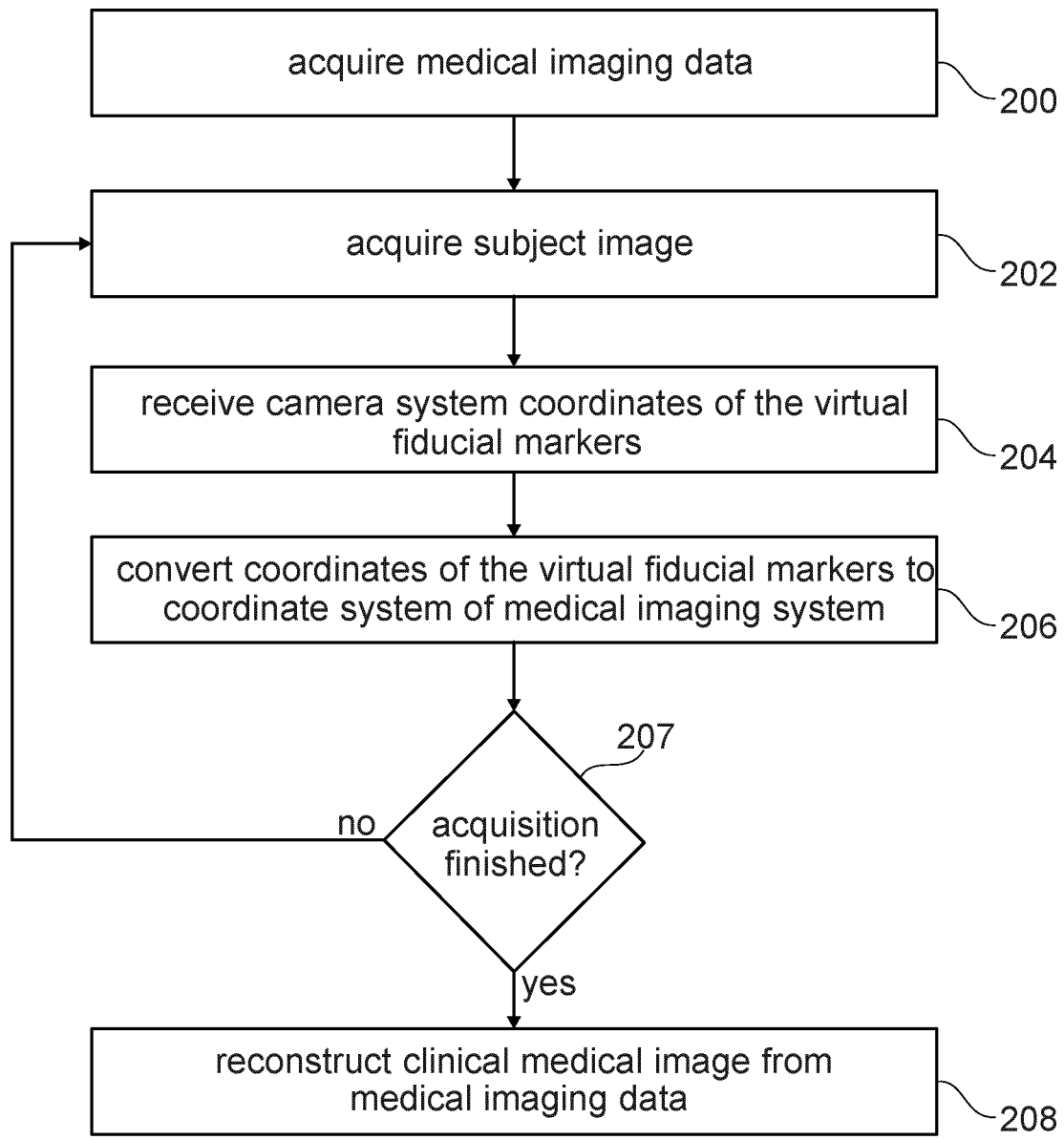
FIG. 2 illustrates a method of using the medical system of FIG. 1.

FIG. 2 shows a flowchart which illustrates a method of operating the medical imaging system 100 of FIG. 1. First, in step 200, the medical imaging data 136 is acquired by controlling the medical imaging system 102 with the medical imaging system commands 134. Next, in step 202, the computational system 120 repeatedly controls the camera system 114 to acquire the subject image 138 during the acquisition of the medical imaging data. Step 200 is considered to occur simultaneously with at least step 202. Step 200 may also occur simultaneously with steps 204 and 206. In step 204 the camera system coordinates of the set of virtual fiducial markers 142 is repeatedly received by inputting the subject image 138 into the image marking neural network 132. Next, in step 206, the image system coordinates 144 of the set of virtual fiducial markers is repeatedly obtained by using the coordinate system mapping 140 to convert the camera system coordinates 142 of the set of virtual fiducial markers into the image system coordinates 144. Next, the method proceeds to step 207 which is a decision box and the question is 'is the acquisition finished?' If the answer is "yes" the method proceeds to step 208, where a clinical image 146 is reconstructed. If the answer is "no," then the method repeats back to step 202 and steps 202, 204 and 206 are repeated until the acquisition is finished. The acquisition started in step 200 continues as long as steps 202, 204 and 206 are repeated.

Figure 3:
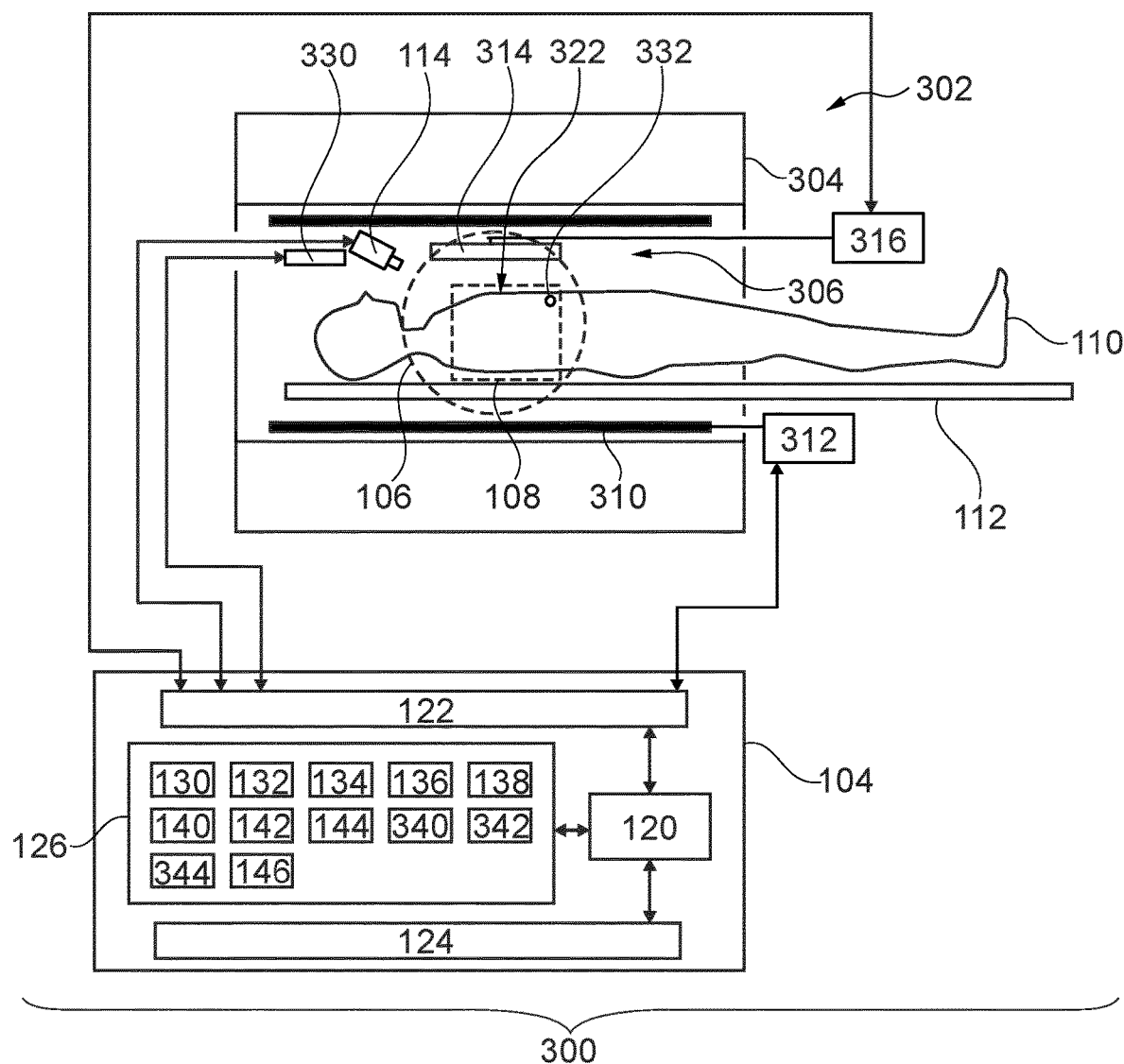
FIG. 3 illustrates a further example of a medical system.

FIG. 3 illustrates a further example of the medical system 300. In this example the medical imaging system is a magnetic resonance imaging system 302. The magnetic resonance imaging system 302 comprises a magnet 304. The magnet 304 is a superconducting cylindrical type magnet with a bore 306 through it. The use of different types of magnets is also possible; for instance it is also possible to use both a split cylindrical magnet and a so called open magnet. A split cylindrical magnet is similar to a standard cylindrical magnet, except that the cryostat has been split into two sections to allow access to the iso-plane of the magnet, such magnets may for instance be used in conjunction with charged particle beam therapy. An open magnet has two magnet sections, one above the other with a space in-between that is large enough to receive a subject: the arrangement of the two sections area similar to that of a Helmholtz coil. Open magnets are popular, because the subject is less confined. Inside the cryostat of the cylindrical magnet there is a collection of superconducting coils.

Within the bore 306 of the cylindrical magnet 304 there is an imaging zone 106 where the magnetic field is strong and uniform enough to perform magnetic resonance imaging. A field of view 108 is shown within the imaging zone 106. The k-space data (medical imaging data 136) that is acquired for the field of view 108. The subject 110 is shown as being supported by a subject support 112 such that at least a portion of the subject 110 is within the imaging zone 106.

Within the bore 306 of the magnet there is also a set of magnetic field gradient coils 310 which is used for acquisition of preliminary magnetic resonance data to spatially encode magnetic spins within the imaging zone 106 of the magnet 304. The magnetic field gradient coils 310 connected to a magnetic field gradient coil power supply 312. The magnetic field gradient coils 310 are intended to be representative. Typically magnetic field gradient coils 310 contain three separate sets of coils for spatially encoding in three orthogonal spatial directions. A magnetic field gradient power supply supplies current to the magnetic field gradient coils. The current supplied to the magnetic field gradient coils 310 is controlled as a function of time and may be ramped or pulsed.

Adjacent to the imaging zone 106 is a radio-frequency coil 314 for manipulating the orientations of magnetic spins within the imaging zone 106 and for receiving radio transmissions from spins also within the imaging zone 106. The radio frequency antenna may contain multiple coil elements. The radio frequency antenna may also be referred to as a channel or antenna. The radio-frequency coil 314 is connected to a radio frequency transceiver 316. The radio-frequency coil 314 and radio frequency transceiver 316 may be replaced by separate transmit and receive coils and a separate transmitter and receiver. It is understood that the radio-frequency coil 314 and the radio frequency transceiver 316 are representative. The radio-frequency coil 314 is intended to also represent a dedicated transmit antenna and a dedicated receive antenna. Likewise the transceiver 316 may also represent a separate transmitter and receivers. The radio-frequency coil 314 may also have multiple receive/transmit elements and the radio frequency transceiver 316 may have multiple receive/transmit channels. For example if a parallel imaging technique such as SENSE is performed, the radio-frequency could 314 will have multiple coil elements.

The camera 114 is imaging a region of interest of the subject 110. In this particular example the thoracic region 322 of the subject 110 is imaged. If another region such as the head or knee were being imaged, then the camera would image these regions. The bore 306 of the magnet also has a display 330 which may be optionally provided to the subject 110 to display an initial subject location indicator and a subsequent location indicator that may be useful for the subject 110 to position her or himself properly after moving. The subject 110 is also wearing an optional subject-mounted gyroscope 332. This is able to track motions of the subject 110 and may be useful in predicting the velocity and therefore the path of the virtual fiducial markers.

The subject 110 has been positioned within the bore of the magnet 106 such that a thoracic region of the subject 110 is positioned within the imaging zone 106. This is however only exemplary. Other regions of the subject 110 such as the subject head could also be positioned to be imaged by the camera system 114 and the magnetic resonance imaging system 302.

The transceiver 316, the gradient controller 312, the camera system 114, and the display 330 are shown as being connected to the hardware interface 1122 of the computer system 104. The medical system 300 may also be useful for planning. The memory 126 is further shown as containing an initial medical image 340 and a selection of a chosen field of view 342. The initial medical image 340 can be registered 344 to the virtual fiducial markers and this may be used for controlling the positioning of the field of view 108.

Figure 4:
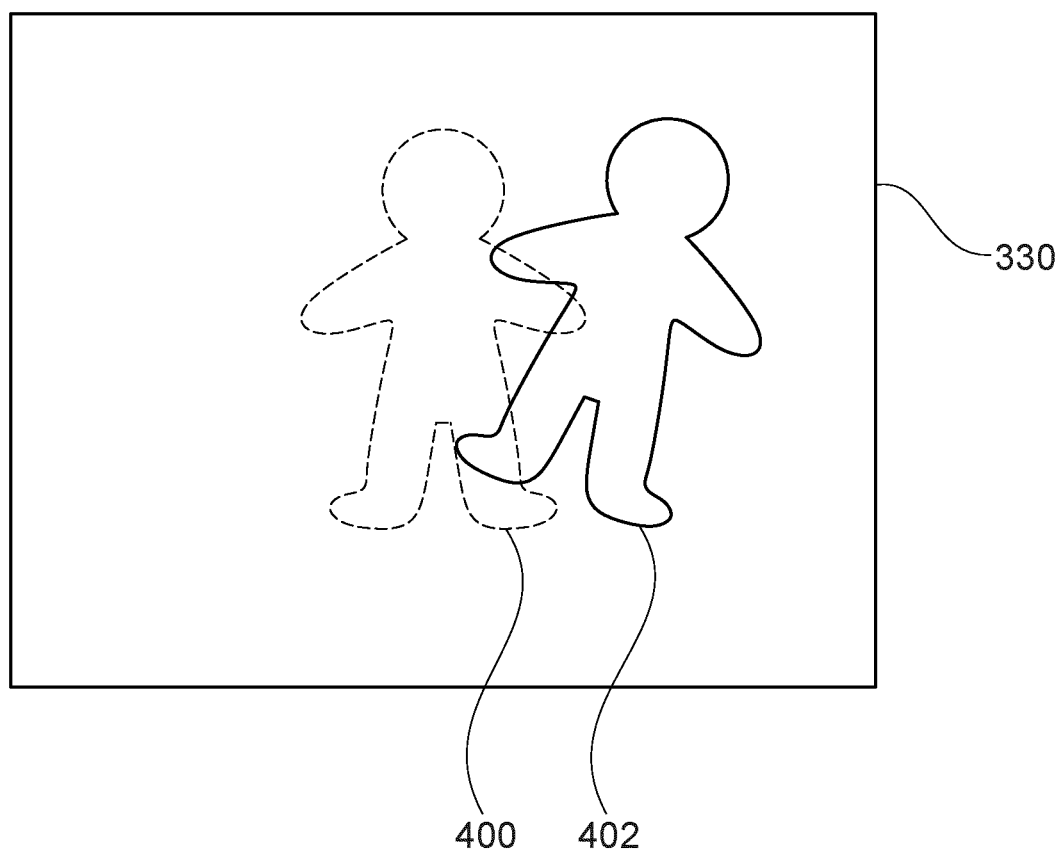
FIG. 4 illustrates an example of a display which may be provided to an operator of a medical imaging system and/or a subject during acquisition of the medical imaging system.

FIG. 4 illustrates one way of implementing the display 330. In this example there is a first object 400, which represents the position of the subject when the examination started. During the course of the examination the location of the virtual fiducial markers are tracked in the coordinate system of the camera 114. Instead of displaying the initial and subsequent location of the fiducial markers in FIG. 4, the first object 400 and the second object 402 represent the location of the fiducial markers at the start and currently. As the subject moves the second object 402 is rotated and translated. This for example may be useful for a subject wishing to reposition her or himself. The first object 400 and the second object 402 may be easier for a subject to understand in a cramped location. As the subject moves back to the correct location the second object 402 returns to the location of the first object 400.

Figure 5:
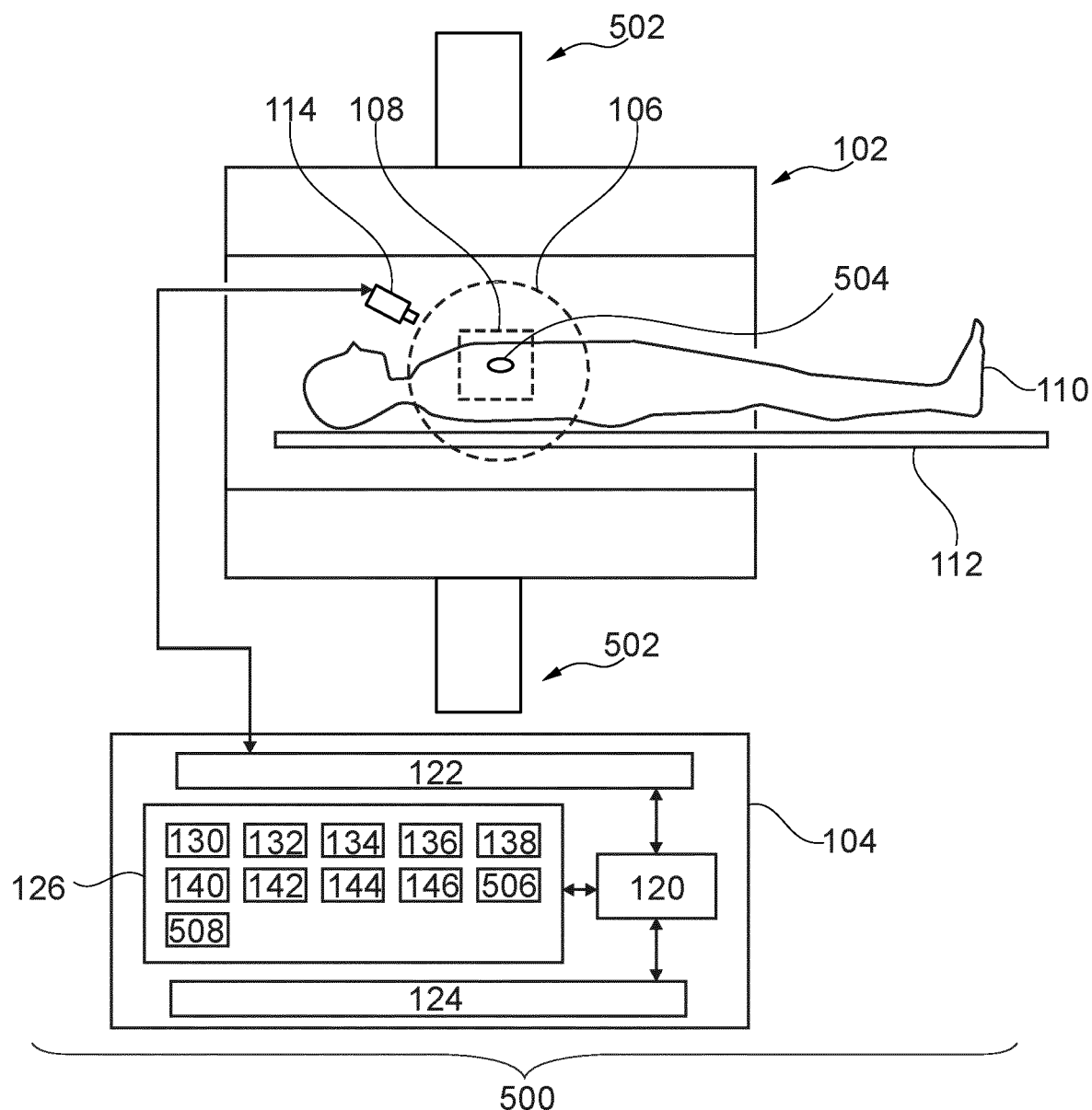
FIG. 5 illustrates a further example of a medical imaging system.

FIG. 5 illustrates a further example of a medical system 500. The medical system 500 in FIG. 5 is similar to that depicted in FIG. 1 except that it additionally comprises a radiotherapy system 502. The radiotherapy system 502 is configured for irradiating a treatment zone 504 and is controllable using radiotherapy control commands 506. The radiotherapy control commands 506 may for example be registered 508 to the clinical image 146. A location of the treatment zone 504 could be detailed in the clinical medical image 146 and then used to modify the radiotherapy control commands 506 to better control the irradiation of the treatment zone 504. The medical system 500 includes the computer 104 and camera 114 as depicted in FIG. 1. The location of the treatment zone 504 and any 3D organ segmentations can be specified in a medical image the same way that a FOV is specified in other embodiments.

An initial medical image, also be referred to as a scout image herein, may be used to plan the images for a medical imaging system examination, such as an MRI exam. The scout is the image, as a matter of fact, it is usually 3-5 low resolution images in three planes (2D scout) or a 3-D low resolution scan, can also be used for covering the anatomy we plan to scan. The scout images are e.g. used to determine the field of view of the diagnostic sequences of medical devices like PET, MR, CT, and etc. Planning the scout is an educated guess; once one has some scout images one can plan the higher resolution image (clinical medical image) with confidence and all subsequent images can be referenced to the same coordinate system.

Subject motion during magnetic resonance imaging (MRI)/PET/CT is another problem to get good higher resolution scans, due to longer MRI scan times in some sequences and due to patient pain, rendering operator to redo the scans. The proposed solution proposes a markerless AI based solution that e.g., automatically plans and keeps track of patient movements correcting for the motion automatically. Also, the proposed marker less solution derives markers (virtual fiducial markers) automatically, as it may register shape model-based landmarks of these external motion sensor inputs like 3D RGBD camera input for example with the scout image landmarks that are automatically detected. Also, some examples use a tracking and planning control system (TPCS) that retrospectively does minor organ motion correction and prospectively corrects major patient physical movements at runtime using the above inputs. Also, this solution at runtime, analyses various inputs like optical, pressure, etc. estimating robust patient pose at runtime and provides feedback to the patient and display in run-time.

Also, as this artificial Intelligence based motion correction may be real-time, it may not only improves the image quality but also may be fast and accurate.

Magnetic resonance imaging (MRI) and positron emission tomography (PET) are of great importance in the diagnosis and treatment of many neurological diseases. These modalities offer unique tissue contrasts at the expense of long image acquisition duration, making patient head motion a critical problem. The degradation of image quality resulting from patient motion can potentially lead to reduced detection of clinically relevant features, negatively influencing diagnosis and treatment. It is estimated that patient motion increases the cost of MRI examinations by $115,000 per scanner per year. At present, there is no sign that the problem of subject motion during MRI examinations will be resolved through hardware improvements. The potential of accelerated imaging seems to be increasingly limited by biologic constraints: peripheral nerve stimulation limits gradient switching speeds; specific adsorption rate (SAR) limits the use of RF excitation pulses; and T1 and T2 relaxation times constrain the sequence repetition and echo times, depending on the required contrast.

The problem is particularly acute in pediatric scans, where sedation and anesthesia are often used, which can lead to adverse reactions. To minimize the negative outcome of such head motion, various methods for motion correction (MC) has been proposed for MRI and PET reconstruction. For MRI, prospective MC, where the imaging field of view (FOV) coordinate system is continuously updated during acquisition, has been demonstrated using a variety of tracking techniques. Retrospective MRI MC uses motion information retrospectively to adjust the reconstruction to compensate for motion-induced errors. Unlike prospective MC, retrospective correction enables reconstruction both with and without motion corrected images. PET only allows retrospective MC, as the acquisition cannot be dynamically adapted to compensate for motion. However, the MC can take place at different phases of the PET reconstruction, from MC of raw list mode data to MC of the reconstructed image frames. These MC methods are generally based on the assumption of knowing the precise head pose (position and orientation) during the scanning.

Motion information can be acquired using different sources, both directly from the acquired imaging data or using an add-on motion-tracking systems. Each approach has its own trade-off in terms of accuracy, complexity of implementation, and demands for additional hardware. Estimating motion from the imaging device itself requires no additional hardware, but can impose additional complexity on the acquisition and reconstruction of the data and may have limited time and spatial resolution at the same time. In the context of MRI, motion data are often acquired by redundant sampling patterns, either built into the imaging acquisition, or interleaved as "motion navigators." In contrast, a variety of methods have been suggested for tracking markers attached to the subject. For MRI, markers have included field probes, active markers, gradient sensors, and optical targets.

In general, markers (fiducial markers) are attached to the subject, and different attachment strategies have been presented for each of these markers to address this challenge. Applying a stamp to the patient's head has also been investigated as a mean to avoid the risk of marker detachment. However, feature extraction from stamps or facial characteristics alone may be computationally expensive or unstable and has been demonstrated only for retrospective correction.

Data-driven motion detection in PET shows promising results. However, it may be difficult to distinguish motion-induced changes from functional changes in tracer distribution over time. These methods resemble a limited time resolution of the motion estimation. Optical marker tracking is somewhat simpler in PET, as the line of sight to the subject is not obscured by receive coils, as in MRI, allowing more flexible marker design. Finally, simultaneous PET/MRI systems can also use the motion information intrinsic in the MRI data to estimate motion for both systems.

Until now, no external motion tracking device has been designed to be compatible with both PET and MRI scanners. Existing solutions for MRI typically require attachment to the receive coils and do not consider the location of the PET detectors. Conversely, motion trackers for PET scanners are not designed to be compatible with the strong magnetic forces acting in the MRI environment.

In one example, the motion tracker is based on a computer vision technology using a structured light surface scanner (camera system 114), continuously scanning the face or other anatomical region of the patient using a synchronized light modulator and camera. This approach requires no attachment of optical markers, reducing the clinical preparation time compared to maker-based solutions. In addition, no patient interaction is required and therefore it does not compromise patient comfort. Further, it eliminates tracking failure due to slipping markers. The system is capable of motion tracking of real patients and a tracking validity parameter (TVP) is used to ensure that the tracking is reliable and that incorrect tracking is not used for motion correction. Using incorrect tracking for motion correction may degrade the images in contrast to correcting the images, which is unacceptable for clinical use especially for prospective MC, where the images without correction does not exist. A TVP is computed for each motion estimate to accept or reject estimates in real time to ensure tracking robustness.

Other examples may use alternate marker selection (alternate virtual fiducial marker selection) built into the algorithm as was explained above with the help of reinforcement learning constantly learning from the environment. Hence this approach may remove limitations caused by Sager paper and reduces the need for a TVP Head motion during PET, SPECT and CT brain scans can cause artefacts and degrade image quality. While motion compensation can dramatically reduce such degradation, motion-compensated brain imaging protocols are not in routine clinical use—likely due to the lack of a practical head tracking method that can be easily integrated into a busy clinical workflow.

Optical tracking provides high-accuracy motion information, but most optical systems are marker-based, requiring attachment of markers to the patient's head. Attached markers can fairly easily become decoupled from the underlying rigid head motion, and more rigid fixation is invasive.

In an example, the markerless tracking system comprises four CCD cameras arranged in pairs and directed at opposite sides of the face. During data acquisition, frames comprising four synchronized images are continuously collected at 30 Hz. For each frame, distinctive features are detected and matched across images to determine 3D head landmarks. As features are matched, the system constructs a database of landmarks and their associated descriptors. This database, which grows steadily throughout the scan, is used by a tracking algorithm to estimate the changing head pose.

To compare marker less tracking with a validated marker-based system, the subjects a swim cap or headband with a large marker attached may be worn. To remove background features from areas such as the neck, clothing and hair, various background masking approaches may be used: strip masking, a rudimentary mask formed by rejecting fixed margins around the image edge; and facial masking, determined using 16 facial landmarks.

Using strip masking, 50-70 facial landmarks may be used for pose computation. The feature matching process was extremely reliable, with very few false matches recorded. And though the system found fewer features on darker skin, due to generally lower contrast, it is able to tracked motion.

Examples may differ from the previous methods; by potentially using combined scout landmarks with motion sensor information (for example RGBD from vision sensors) to plan the MR exam. One may rely on tracking the registered features, with on-field AI patient learning of the external features of the person using the camera and implying the effect on the planned anatomy features of the person using this method. This will be similar to the registration of the anatomy with respect to the image, but will be much faster (real time) which can be used as a prior estimate of the anatomy given the camera image, which will be reducing the overall scan time, and also as the motion correction mechanism for the scan (MR etc.) providing feedback to both patient and technician. This may also enhance the accuracy of marker less approaches by exploiting the information provided by other sensors like gyroscope placed on the patient. Patients may not readily understand the location of various anatomies. Overlaying the MR scan with that of the patient's 3D optical scan can facilitate better patient engagement.

Figure 6:
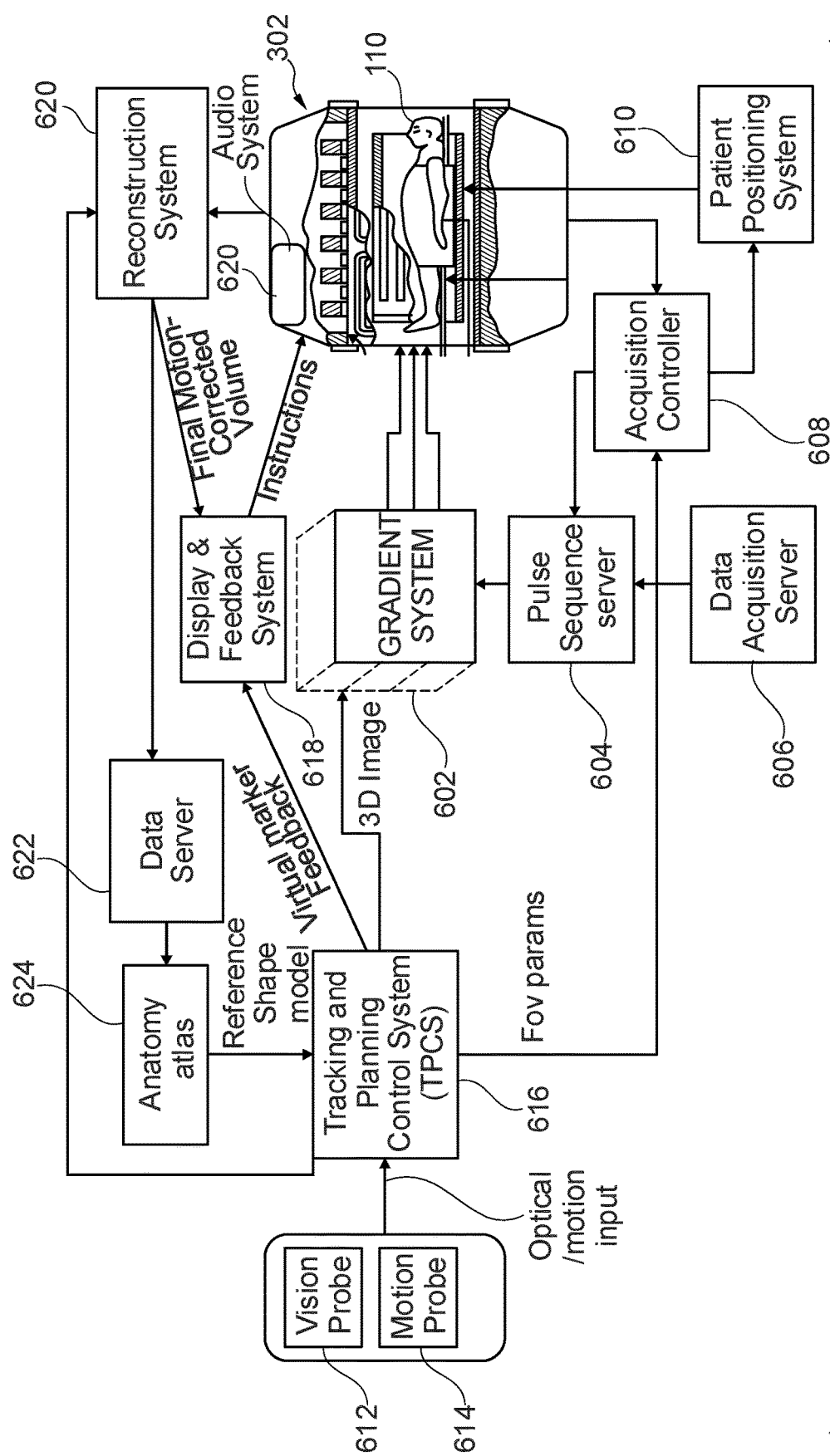
FIG. 6 illustrates a further example of a medical system.

FIG. 6 illustrates a further example of a medical system 600 that comprises a magnetic resonance imaging system 302. The magnetic resonance imaging system has a gradient system 602, a pulse sequence server 604, a data acquisition server 606, an acquisition controller 608, and a patient positioning system 610. There is a vision probe 612 and a motion probe 614 that feed data to a tracking and planning control system 616. The tracking and planning control system 616 feeds data to the acquisition controller 608 to adjust acquisition of the magnetic resonance imaging data. The tracking and planning control system 616 is also used to control the gradient system for proper 3D imaging. The tracking and planning control system 616 also feeds data in the form of virtual marker feedback to a display and feedback system 618. The tracking and planning control system 616 also feeds data to a reconstruction system 620 which reconstructs magnetic resonance images. The display and feedback system 618 could for example control the display 330 or it could also control an audio system 620 that gives instructions to the subject 110. The reconstruction system 620 also provides images to the display and feedback system 618 as well as providing data to a data server 622 that feeds data to an anatomical atlas 624. The anatomical atlas 624 may be used to provide reference shape models to the tracking and planning control system 616.

FIG. 6 illustrates an MRI system 302 as the medical imaging system. However this is purely illustrative. Other types of medical imaging systems may be substituted for the magnetic resonance imaging system 302. The overall medical system 600 is independent and can work with multi-modality and multi-vendor systems that may include one or more of the following features:

Tracking and planning Control System (multi-modality and multi-vendor system)
    Tracking and Planning Control System 616:
        624 provides vision and motion input to the processor (computational system).

Reinforcement learning system is initialized with the suitable initial Anatomical model, which shall create mapping between the vision, motion input and the initial Anatomy shape model Provides output of FOV in magnet co-ordinate system.

The output is fed to the Acquisition controller 608, which in turn adjusts patient position system 610, Gradient System 602 prospectively and Reconstruction System 604 retrospectively Reconstruction system 620

Retrospective motion correction

Anatomy shape model 624:

Using the patient data in the data server 622, a suitable anatomical model shall be matched, for initializing the initial plan.

Display & Feedback system 618

Figure 7:
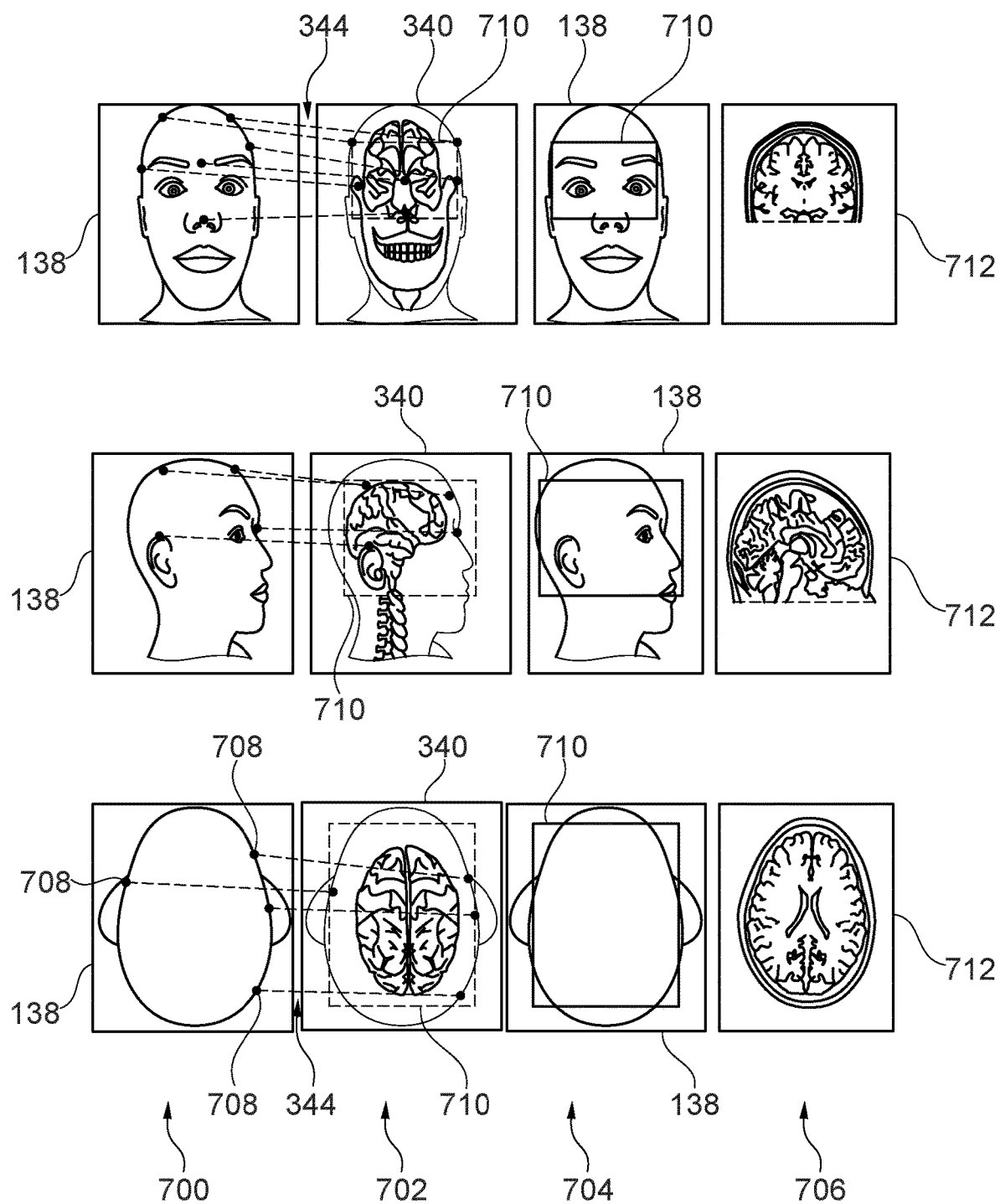
FIG. 7 illustrates the registration of virtual fiducial markers to an initial medical image.

FIG. 7 shows several different images in four columns, the first column, 700, the second column 702, the third column 704, and the fourth column 706. In the first column 700 there are shown subject images 138 with virtual fiducial markers 708. In the second column 702 are displayed initial medical images 340. They also contain the fiducial markers 708 and there is a registration 344 between the two of them. There is a chosen field of view 710 also marked on the initial medical images 340. The location of the fiducial markers in the images in column 700 can be used to position the chosen field of view on the images in the third column 704. In this column the chosen field of view 710 is superimposed on the subject image 138. In column 706 there are a number of scout images 712 acquired for the corresponding field of view 710 in the column 704.

Figure 8:
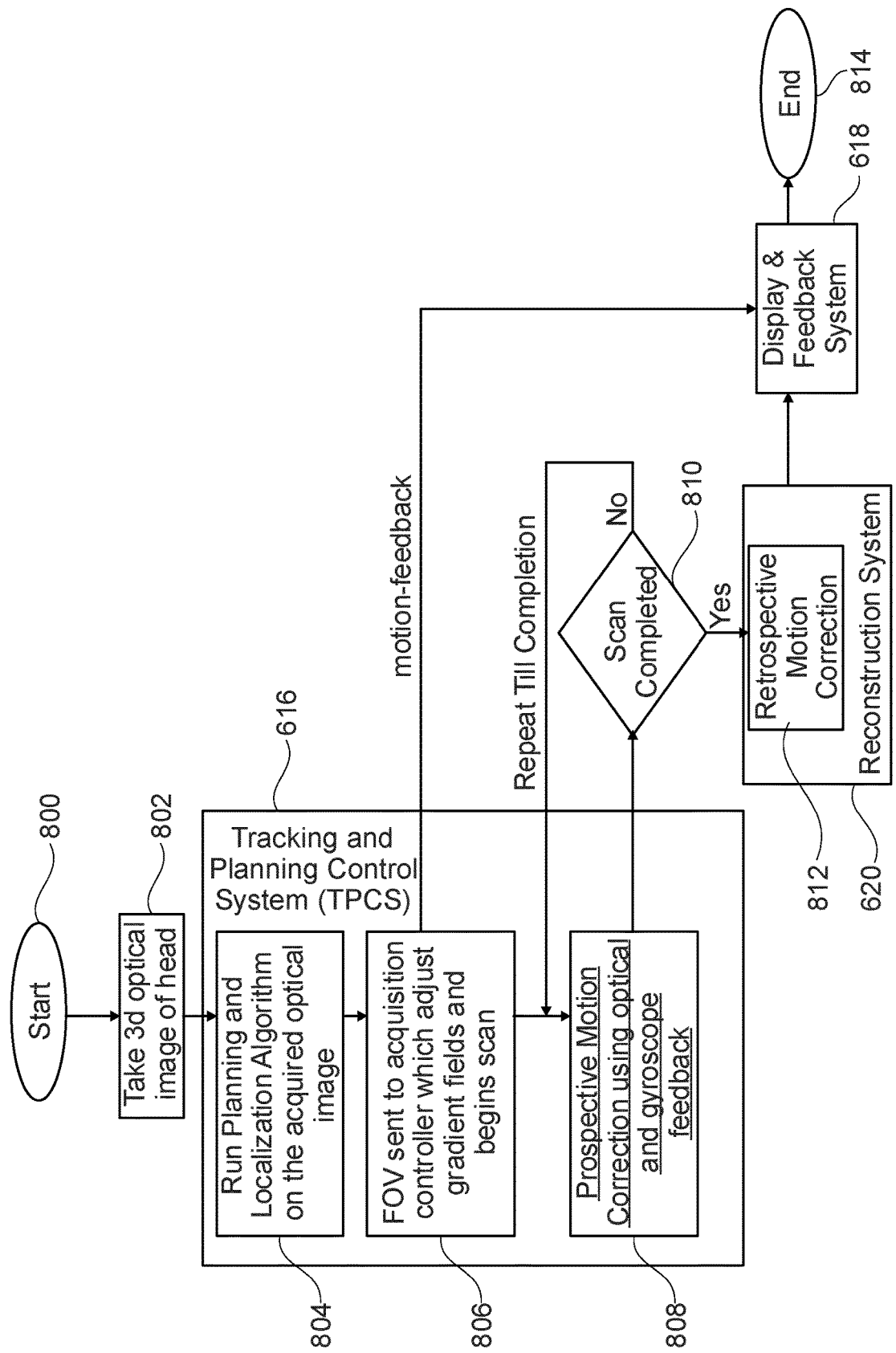
FIG. 8 shows a flow chart which illustrates a further method.

FIG. 8 illustrates a method of using the medical system 600 depicted in FIG. 6. The method starts in block 800 and then proceeds to step 802, where a 3D optical image of the head is acquired. The method then uses block 616, which is the tracking and planning control system. The tracking and planning control system first in step 804 runs planning and localization algorithm on the acquired optical image. Next, in step 806, a field of view is sent to acquisition controller, which adjusts the gradient fields and begins the scan. The method then proceeds to step 808, where a prospective motion correction using an optical and/or gyroscopic feedback occurs. The method then proceeds to decision box 810. 'Is the scan completed?' is the question for box 810, if the answer is no then the method returns back to step 808 and this is repeated until the scan is completed. Once the scan is completed the method proceeds to use the reconstruction system 620 where retrospective motion correction 812 is performed. After block 812 the method proceeds to use block 618 from FIG. 6 which is the display and feedback system. For example, audio commands or visual commands could be provided to the subject 110. The field of view from block 806 is also sent to the display in feedback system 618. The method then ends in step 814.

Figure 9:
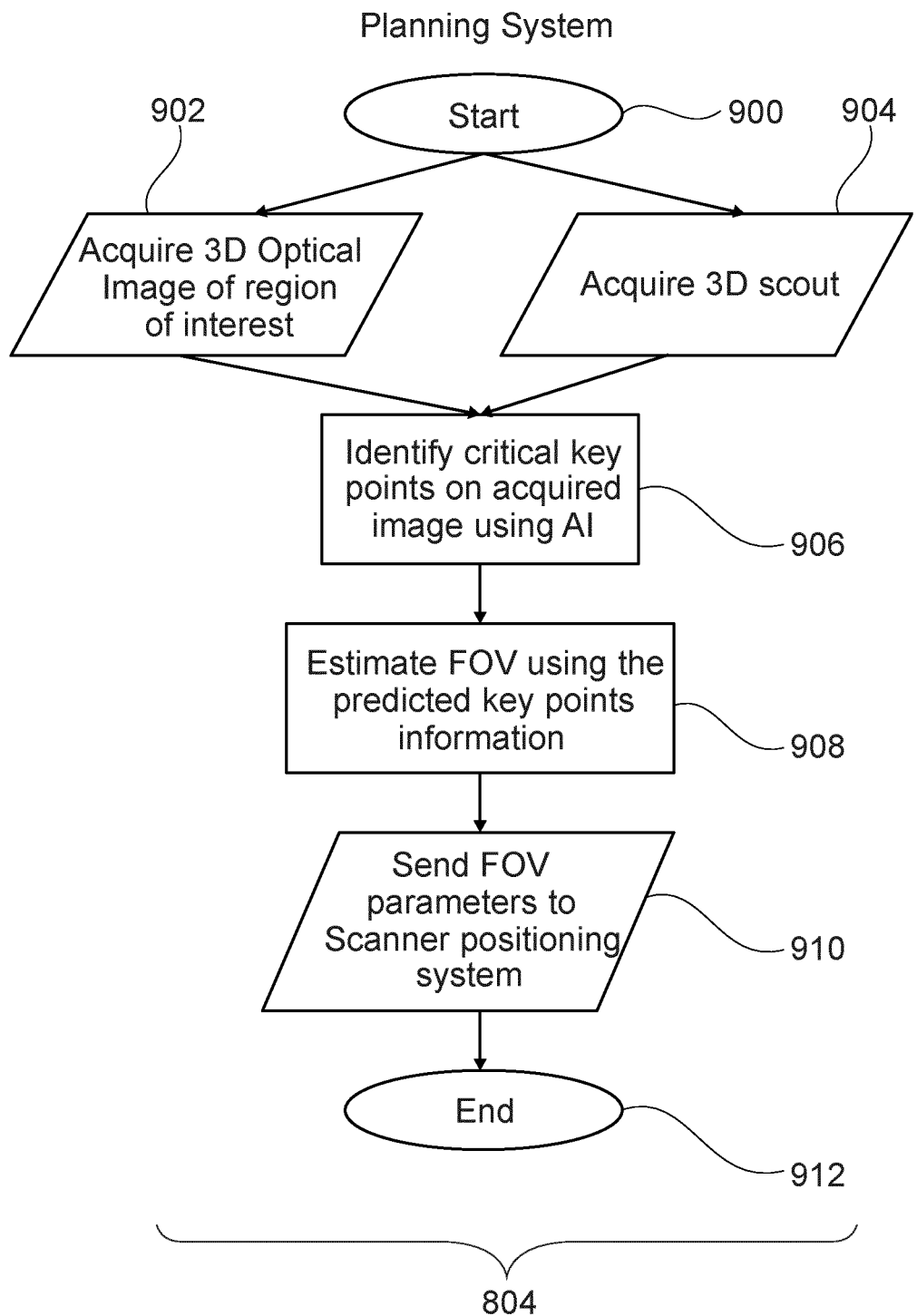
FIG. 9 shows a flow chart which illustrates a further method.

FIG. 9 shows a flowchart which illustrates the block 804, which is the run planning and localization algorithm on the acquired optical image in greater detail. The method starts in step 900. The method then proceeds to step 902 and optionally step 904 at the same time. In step 902 the 3D optical image region of the head is acquired. The method then proceeds to block 906. In the optional step 904 a three-dimensional scout image or a scout medical image is acquired. At step 906 critical key points on the acquired image are identified using artificial intelligence. This is equivalent to using the image marking neural network 132 to identify the set of virtual fiducial markers. Next the method proceeds to step 908 where the field of view is estimated using the predicted key points or virtual fiducial markers as information. The method then proceeds to step 910 and the field of view parameters are sent to the scanner positioning system. The explanation then ends in block 912.

Figure 10:
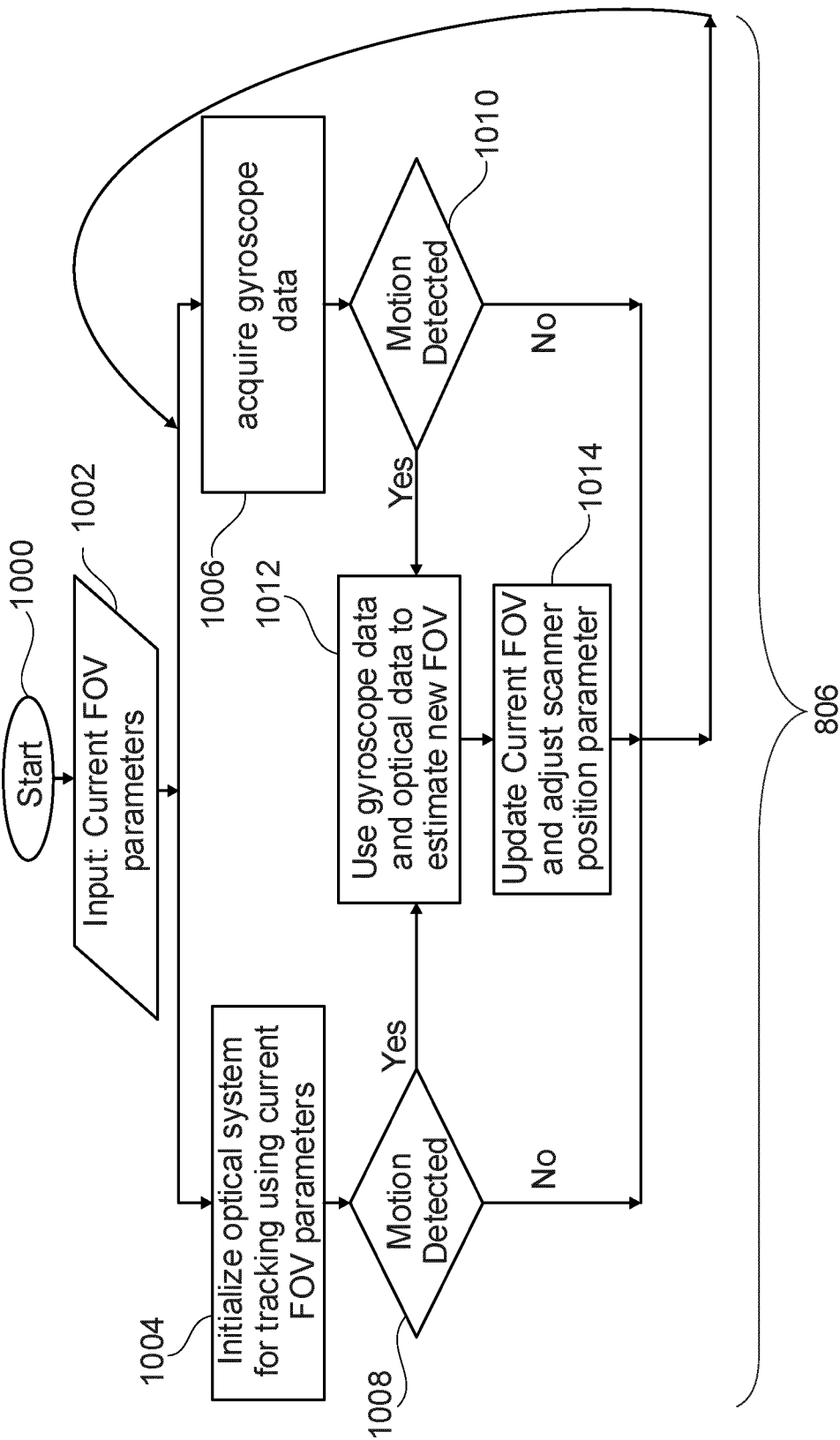
FIG. 10 shows a flow chart which illustrates a further method.

FIG. 10 is a flowchart which illustrates the details of block 806 of FIG. 8 in more detail. The method starts in block 1000 and proceeds to block 1002 where the current field of view parameters are input. This data is then provided both to blocks 1004 and 1006. In block 1004 the optical system for tracking using current field of view parameters is initialized. In block 1006 the gyroscope data is acquired. Block 1004 proceeds to block 1008 and is a question box to determine if motion is detected. If no motion is detected then the method proceeds to perform in box 1004 and 1006 again. If motion is detected using the gyroscope then the method proceeds to block 1012.

Block 1006 proceeds to block 1010. This is also a question box whether motion is detected using the gyroscope. If no motion is detected then the method proceeds back to steps 1004 and 1006 again. If motion is detected the method then also proceeds to block 1012 as did block 1008. In block 1012 the gyroscope data is used as well as optical data to estimate a new field of view. In block 1014 the current field of view is updated and adjusts the scanner position parameters. After block 1014 is performed the method then proceeds back to blocks 1004 and 1006.

Figure 11:
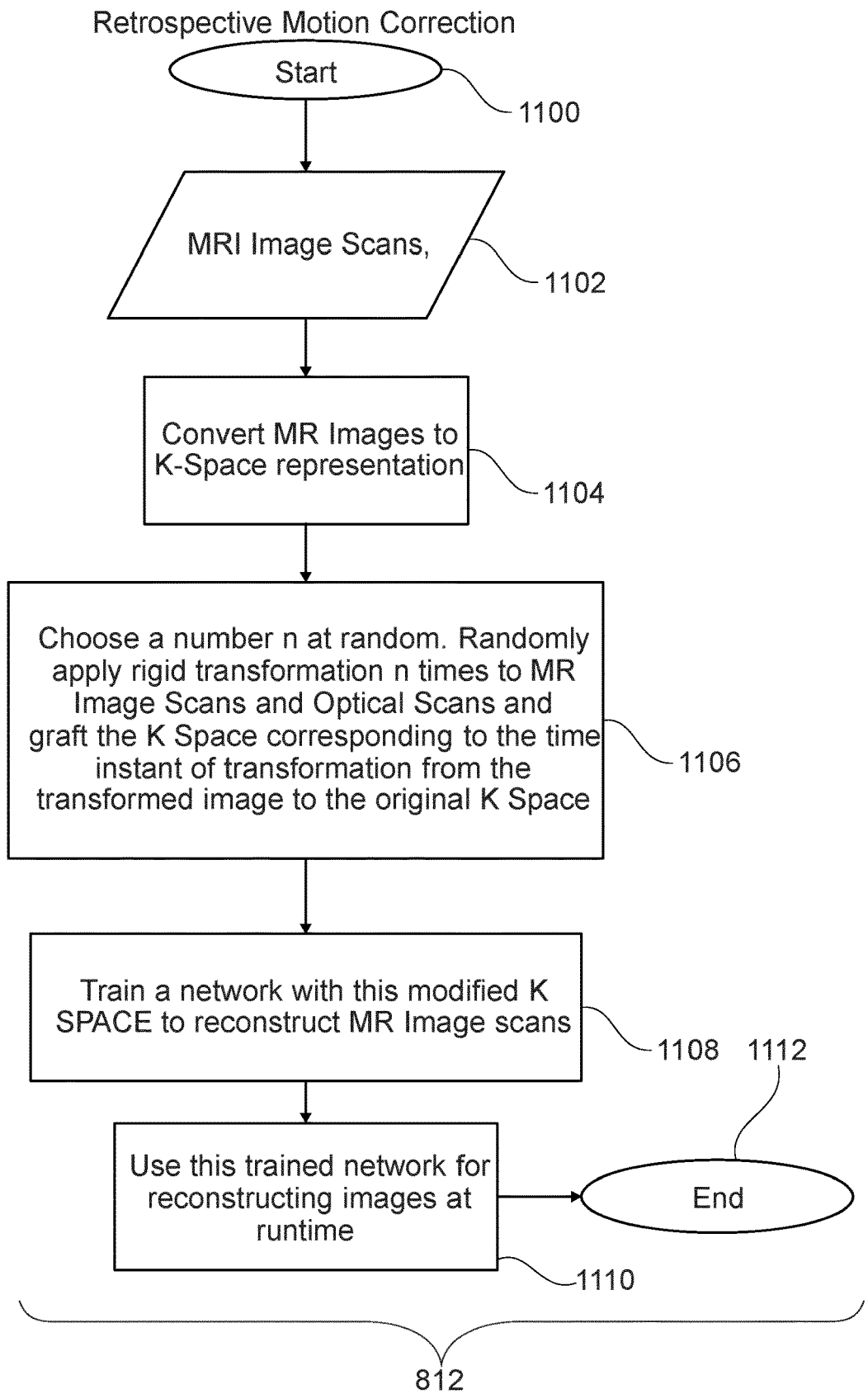
FIG. 11 shows a flow chart which illustrates a further method.

FIG. 11 illustrates retrospective motion correction and is a greater in-depth explanation of block 812 from FIG. 8. First the method starts in block 1100. This then proceeds to block 1102 which are the MRI image scans. In block 1104 the magnetic resonance images are converted to a k-space representation. In block 1106 a number n is chosen at random then randomly apply a rigid transformation n times to magnetic resonance image scans and optical scans and graph the k-space corresponding to the time incident of a transformation from the transformed image to the original k-space. The method then proceeds to block 1108 where a neural network is trained with this modified k-space to reconstruct the magnetic resonance image scans. In block 1110 this trained neural network is used for reconstructing images at runtime. The method then ends in block 1112. The method in FIG. 11 therefore illustrates one way of training a neural network for use in retrospective motion correction.

Figure 12:
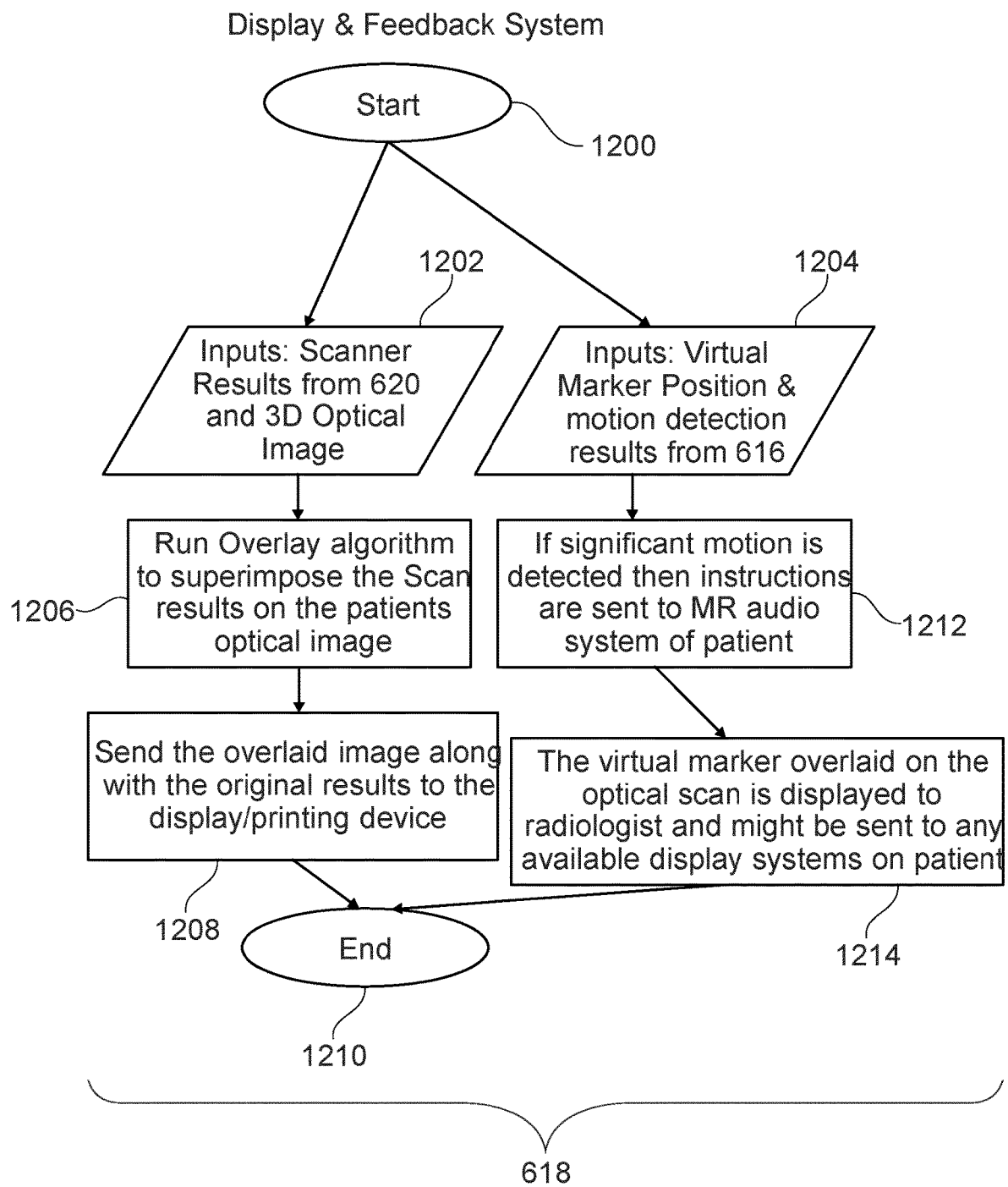
FIG. 12 shows a flow chart which illustrates a further method.

FIG. 12 shows a flowchart which illustrates block 618 of FIG. 6 in more detail. This is an explanation of the display and feedback system. The method illustrated in FIG. 12 starts with block 1200 and then follows both blocks 1202 and 1204. In block 1202 input from the scan results from the reconstruction system 620 and 3D optical images are provided. Next block 1202 proceeds to block 1206. In this step an overlay algorithm is run to superimpose the scan results on the patient's optical image. The block then proceeds to step 1208. The overlaid image is sent along with the original results to the display or printing devise. After block 1208 the method proceeds to block 1210 where the method ends. The parallel step 1204 is to provide inputs for a virtual marker position and motion detection results from the tracking and planning control system 616. After block 1204 is finished it proceeds to block 1212 where if significant motion is detected then instructions are sent to the magnetic resonance audio system 620 of the patient or subject 110. The method then proceeds to block 1214 where the virtual marker is overlaid on the optical scan is displayed to the radiologist and optionally the subject might be sent to any available display systems for the patient.

FIGS. 8 through 12 are explained again below:

A. The Markerless Tracking, scoutless planning System is explained below, shown in FIG. 8.

Before the start of the MR scan. A 3D optical image is taken which is the fed to the planning subsystem 804.

The planning subsystem outputs the FOV parameters to the acquisition controller and the gradient fields are adjusted accordingly 608

The scan is initiated and the prospective motion correction subsystem 808 sends feedback to the acquisition controller to adjust the FOV if and when a motion happens.

This process of monitoring and feedback continues until scan completion

The scan output is reconstructed using 812

The scan output is sent to the display system 618 which overlays the scan and the 3D optical image to make the output patient friendly B. Planning. System 804 is explained below as shown in FIG. 9.
  a. The planning system receives the acquired 3D optical image 902 from the camera system and the scout scan 904
  b. Critical key points are identified from the optical image and the scout scan and they are co registered 906.
  c. FOV is estimated using the key points and this region is marked on the optical image creating a virtual marker 908.
  d. The estimated FOV is sent to the acquisition controller system that adjusts the gradient fields 910.

C. Prospective Motion Correction System 808 as shown in FIG. 10.
  1. Current FOV parameters are taken as input from the acquisition controller 1002
  2. These parameters are used to initialize the optical tracking system and gyroscope tracking system (1004, 1006)
  3. When either system detects motion, the optical and gyroscope data is used to compute the new FOV parameters and this is updating the acquisition controller that adjusts gradient fields.
  4. The tracking systems are then re initialized according to the new FOV parameters.
  5. This process continues until scan completion D. Retrospective Motion Correction System 812
  a. Uses optical signals as additional inputs
  b. The algorithm denoises the scan during the reconstruction hence it saves time by removing denoising steps post reconstruction
    i. The reconstruction algorithm is replaced by a neural network
    ii. The neural network is trained to be robust to k-space distortions caused by rigid body transformations
    iii. This robustness is induced into the neural network during the training process by simulating rigid body transformations. The simulation is as follows:
      1. The original image is converted to its k-space representation
      2. A rigid body transformation is applied onto the original image and corresponding optical scans.
      3. The transformed image is converted to its k-space representation.
      4. The new optical scans replace the original optical scans after a certain #slices. This indicates a patient movement after a certain time t.
      5. All K Space points that are sampled after time t are replaced with k space obtained from transformed image.
      6. Steps 2-5 are repeated a random # of times (2-10). These indicates no of movements. Each movement is sequential
    iv. The reconstructed image of the neural network would have an orientation similar to the standard registered images.

E. Display & Feedback System 618 is explained below as shown in FIG. 12.
  a. Display pathway (post-scan):
    i. The scan output is acquired from the MR system and the 3D optical image is acquired from the optical system 1202
    ii. An overlay algorithm is used to overlay the scan anatomy and the 3D image 1206
    iii. This overlaid image and the scanned image are sent to the monitor or printing device for actual viewing/printing 1208
  b. Patient Feedback: The virtual marker overlay may be fed back to the patient using MR equipment and audio system to the patient along with instruction which will help the patient maintain the proper orientation during the scan (1204, 1212, 1214). Optionally patient commercial equipment that is MR compatible lie google glass, apple air pods can be used in future.

3. Following features may be part of the algorithm:
  Optical-Scout registered scan for various modalities including MR, CT, PET:
  Finding the key points in the reference coordinate system from the MR compatible conventional camera (3-D), then predicting the anatomy features corresponding to the image (similar to MR image), and planning on the conventional camera geometry.
  One point is the transformation between different coordinate systems. The camera coordinates, patient coordinates and MRI coordinate system may be transformed into a single coordinate system which will be solving
    Patient motion estimation and correction (both prospective and retrospective
    Optical-Scout registered planning.
  Including gyroscope separately or coupled with the camera for the accurate motion estimate
  MRI enabled surgical planning—(MR scan done previously should be viewed/registered on the live image coming out of the camera enabling the surgery smoother and better)
  Smart plan on the actual image for different regions (both brain and other body parts)—covering the clothing aspect also in the modelling (IR camera can also be used)—coupling IR camera and the 3-D camera.
  The camera can be positioned at different positions: fixed to the table, or attached to the coil Examples may contain one or more of the following features:
  1. Using camera and gyroscopes for the Optical-Scout registered planning and motion corrected scan, Overlaying the MR scan with 3d optical scan for better patient understanding. Using optical scan registered with scout images for planning 2. Creating virtual markers for tracking based on optical images
   a. Using optical scan registered with scout images for planning. The joint pose estimation algorithm enables the creation of a virtual marker.
   b. The created virtual marker is then tracked using the optical system. This is done by superimposing the created virtual marker with the optical scan using image processing techniques
   c. The optical system for motion detection is further enhanced by the information from motion probes which further enhances accuracy.
3. An algorithm to combine retrospective motion correction based on optical images with reconstruction
   a. To avoid too much adjustment the prospective motion correction is complemented by a retrospective motion correction system. The prospective motion correction system handles large deviations. Upon encountering a large deviation, the prospective motion correction system changes the positioning parameters of the gradient fields to realign with the initial FOV, the optical scans are also readjusted according to this. The smaller changes are addressed by the retrospective motion correction system.
   b. The novel algorithm that combine retrospective motion correction based on optical images with reconstruction helps reduce the overall time and also forms a good complement to the marker less tracking and motion correction algorithm
4. The overlaid Display & Feedback system helps the patient, operator and the radiologist better grasp the location and extent of an abnormality if present. A user-friendly display/voice system (e.g. MR compatible devices like google glass/apple air pods) which helps the layman patient identify where the problem is present
5. Also using AI based models, the data can be trained to map the brain with the anatomy location which can help to create seamless survey, which can reduce the overall scan time and can change the workflow of MRI scan is acquisition.
6. Surgery planning can be modified a lot using the 3-D camera based coupled MRI scan for the tumor or anomaly. As far as our knowledge is concerned, this work has not been done in the medical scanning, especially for scout less survey planning.

F. Examples may contain one or more of the following features and/or benefits.
   Continuously learning both minor organ motion correction and major patient physical movements at runtime together and applying it to perform correction in the scan. (addressed by 616, 812)
   Does not use the power of patient-agnostic learning to detect and track accurately the key points on the subanatomies planned. (addressed by 624)
   Use of additional marker equipment along with sensor is adding up to the overall motion correction cost (addressed by 804)
   Patient discomfort due to marker equipment caused is removed with the use of virtual markers in this invention (addressed by 804)
   Unnecessary corrections are avoided in prospective motion correction by limiting its usage to correcting only large motions. The smaller motions are corrected using retrospective motion correction system. (addressed by 616 and 620)
   Combine motion correction parameters with reconstruction can improve the overall reconstruction time (addressed in 620, 812)
   The overlaid display helps the patient better grasp the location and extent of an abnormality if present. with patient guidance (addressed by 618)

G. Applications of the invention may include one or more of the following:
   The application of the invention is detailed below,
      Using optical imaging along with scout images to perform the FOV planning thereby making the whole process more robust and facilitating subsequent motion tracking.
      The virtual marker can be used for subsequent optical tracking during scan.
      Using a wearable gyroscope to improve the performance of motion estimation of the optical system.
      An improved retrospective motion correction based on optical scan which would occur simultaneously along with reconstruction thereby reducing time. This may provide for prospective motion correction using camera coordinates.
      The overlaid display helps the patient; operator and the radiologist better grasp the location and extent of an abnormality if present.

Figure 13:
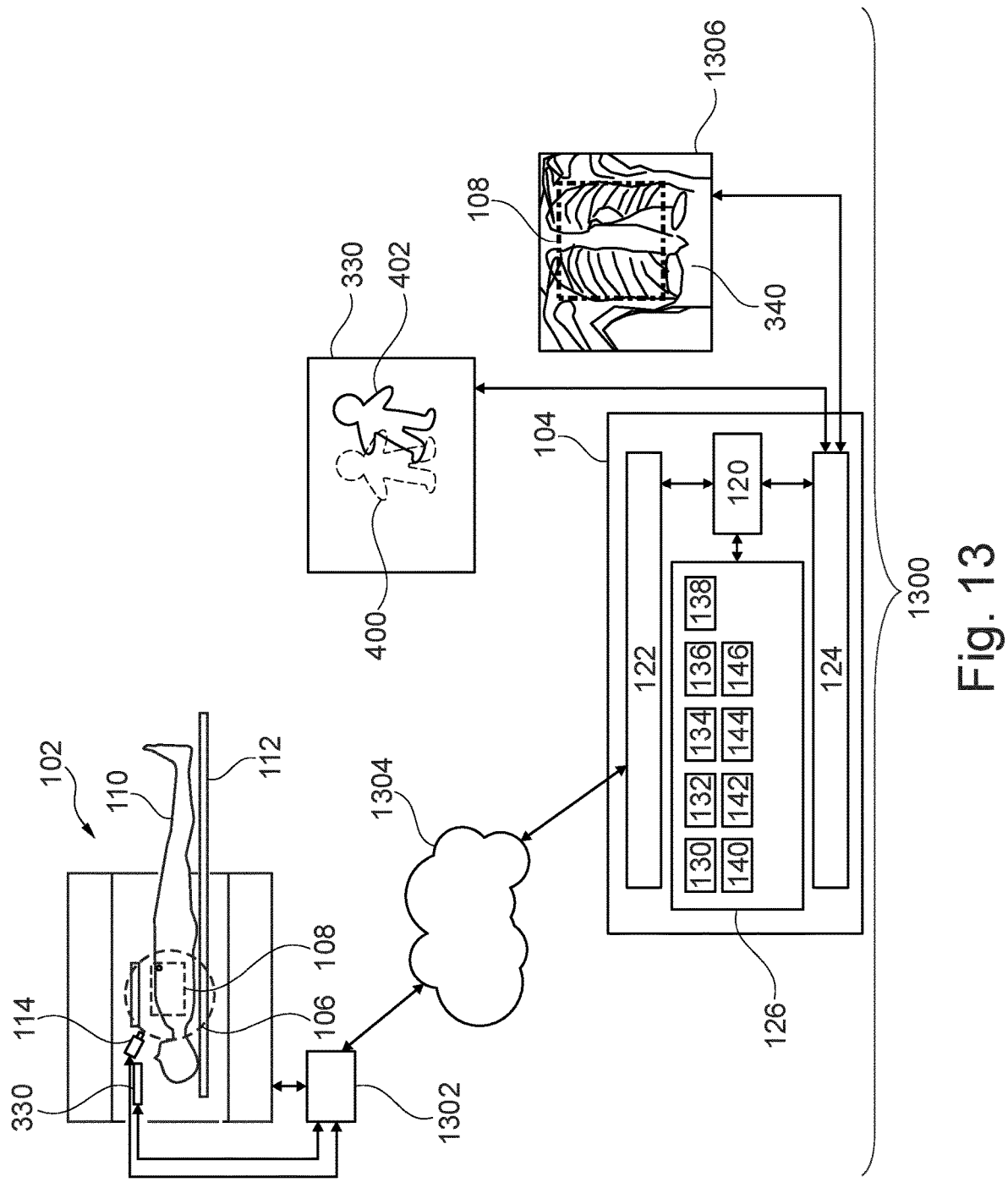
FIG. 13 illustrates a further example of a medical system.

FIG. 13 illustrates a further example of a medical system 1300. The medical system 1300 of FIG. 13 is similar to the medical system 100 of FIG. 1 with several configuration changes. The medical system 1300 is suitable for telemedicine. The medical imaging system 102 is controlled by a local controller 1302. The local controller is shown as being connected via a cloud computing system 1304 (or network connection) to the computer 104.

The computer 104 is shown as further comprising a user interface 1306. The initial medical image 340 is displayed and the operator can select the location of the field of view 108. Using the registration between the virtual fiducial markers and the initial medical image 304 or a registration between the virtual fiducial markers the field of view 108 the acquisition of the medical imaging data 136 can be performed automatically. The memory 126 of the computer 104 is shown as containing the same contents as the computer 104 in FIG. 1. However, functionality of the computer 104 may be shifted to the local controller 1302.

To assist remote control of the medical imaging system 102. A display 330 is provided within view of the subject 110. May be used by the subject to position her or his self and perform self-control in restricting motion during the examination. To assist the operator, the display is also provided at the remote location. The operator may then have knowledge about the current position of the subject and if the subject is moving during the examination.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

REFERENCE SIGNS LIST

- 100 medical system
- 102 medical imaging system
- 104 computer
- 106 imaging zone
- 108 field of view
- 110 subject
- 112 subject support
- 114 camera system
- 120 computational system
- 122 hardware interface
- 124 user interface
- 126 memory
- 130 machine executable instructions
- 132 image marking neural network
- 134 medical imaging system commands
- 136 medical imaging data
- 138 subject image
- 140 coordinate system mapping
- 142 camera system coordinates of set of virtual fiducial markers
- 144 image system coordinates of set of virtual fiducial markers
- 146 clinical image
- 200 acquire medical imaging data by controlling the medical imaging system with the medical imaging system commands
- 202 repeatedly control the camera system to acquire the subject image during acquisition of the medical imaging data
- 204 repeatedly receive the camera system coordinates of the virtual fiducial markers by inputting the subject image into the image marking neural network
- 206 repeatedly provide imaging system coordinates of the set of virtual fiducial markers by repeatedly converting the camera system coordinates of the virtual fiducial markers to the provided imaging system coordinates of the virtual fiducial markers using the coordinate system mapping
- 207 acquisition finished?
- 208 reconstruct a clinical medical image from the medical imaging data
- 300 medical system
- 302 magnetic resonance imaging system
- 304 magnet
- 306 bore of magnet
- 310 magnetic field gradient coils
- 312 magnetic field gradient coil power supply
- 314 radio-frequency coil
- 316 transceiver
- 322 thoratic region
- 330 display
- 332 subject mounted gyroscope
- 340 initial medical image
- 342 chosen field of view
- 344 registration
- 400 first object
- 402 second object
- 500 medical system
- 502 radiotherapy system
- 504 treatment zone
- 506 radiotherapy control commands
- 508 registration to clinical image
- 600 medical system
- 602 gradient system
- 604 pulse sequence server
- 606 data acquisition server
- 608 acquisition controller
- 610 patient positioning system
- 612 vision probe
- 614 motion probe
- 616 tracking and planning control system
- 700 first column
- 702 second column
- 704 third column
- 706 fourth column
- 708 virtual fiducial marker
- 710 chosen field of view
- 712 scout image or initial medical image
- 800 start
- 802 Take 3D optical image of head
- 804 Run planning and localization algorithm on the acquired optical image
- 806 Field of view sent to acquisition controller which adjusts gradient fields and begins scan
- 808 Prospective motion correction using optical and gyroscope feedback
- 810 Scan completed?
- 812 Retrospective motion correction
- 814 End
- 900 Start
- 902 Acquire 3D optical image of region of interest
- 904 Acquire 3D scout image
- 906 Identify critical key points on acquired image using AI
- 908 Estimate field of view using the predicted key points information
- 910 Send field of view parameters to scanner positioning system
- 912 End
- 1000 Start
- 1002 Input: current field of view parameters
- 1004 Initialize optical system for tracking using current field of view parameters
- 1006 acquire gyroscope data
- 1008 Motion detected?
- 1010 Motion detected?
- 1012 Use gyroscope data and optical data to estimate new field of view
- 1014 Update current field of view and adjust scanner position parameters
- 1100 Start
- 1102 MRI image scans
- 1104 Convert MR image to k-space representation
- 1106 Choose a number n at random. Randomly apply rigid transformation n times to MR image scans and optical scans and graft the k-space corresponding to the tie instant of transformation from the transformed image to the original k-space
- 1108 Train a neural network with this modified k-space data to reconstruct MR image scans
- 1110 Use this trained neural network for reconstructing images at runtime
- 1112 End
- 1200 Start
- 1202 Inputs: Scanner results from 620 and 3D optical image

1204 Inputs: Virtual marker position and motion detection results from 616
1206 Run overlay algorithm to superimpose the scan results on the patients optical image
1208 Send the overlaid image along with the original results to the display/printing device
1210 end
1212 If significant motion is detected then instructions are sent to MR audio system of patient
1214 The virtual marker overlaid on the optical scan is displayed to radiologist and might be sent to any available display systems for the patient
1300 medical system
1302 local controller
1304 cloud or internet connection
1306 user interface

The invention claimed is:

1. A medical system comprising:
a medical imaging system configured to acquire medical imaging data descriptive of a subject from an imaging zone, wherein the medical imaging system has an image system coordinate system;
a camera system configured to acquire a subject image of the subject during acquisition of the medical imaging data, wherein the camera system has a camera coordinate system;
a memory configured to store machine executable instructions, medical imaging system commands, a coordinate system mapping, and an image marking neural network; wherein the coordinate system mapping is a mapping between the system coordinate system and the camera coordinate system; wherein the image marking neural network is configured to receive an input image descriptive of a predetermined anatomical region of the subject, wherein the image marking neural network is further configured to output camera system coordinates of a set of virtual fiducial markers in the input image in response to receiving the input image, wherein the medical imaging system commands are configured to control the medical imaging system to acquire the medical imaging data;
a computational system configured to control the medical system, wherein execution of the machine executable instruction causes the computational system to:
acquire the medical imaging data by controlling the medical imaging system with the medical imaging system commands;
repeatedly control the camera system to acquire the subject image during acquisition of the medical imaging data;
repeatedly receive the camera system coordinates of the virtual fiducial markers by inputting the subject image into the image marking neural network; and
repeatedly provide imaging system coordinates of the set of virtual fiducial markers by repeatedly converting the camera system coordinates of the virtual fiducial markers to the provided imaging system coordinates of the virtual fiducial markers using the coordinate system mapping.

2. The medical system of claim 1, wherein execution of the machine executable instructions further causes the computational system to:
receive an initial medical image prior to beginning acquisition of the medical imaging data;
receive a chosen field of view identified in the initial medical image;
calculate a registration between the imaging system coordinates of the virtual fiducial markers and the initial medical image; and
configure the pulse sequence commands to acquire the medical imaging data from the chosen field of view using the registration.

3. The medical system of claim 2, wherein the initial medical image is any one of the following: an anatomical atlas image, a scout scan of the subject, and a prior medical image of the subject.

4. The medical system of claim 2, wherein execution of the machine executable instructions further causes the computational system to repeatedly adjust the medical imaging system commands to acquire the medical imaging data from the chosen field of view using the registration in response to a change in the imaging system coordinates of the virtual fiducial markers.

5. The medical system of claim 4, further including at least one of the following:
the medical imaging system commands are adjusted such that the chosen field of view matches the most recent imaging system coordinates of the virtual fiducial markers; and
the pulse sequence commands are adjusted such that the chosen field of view matches predicted coordinates of the imaging system coordinates of the virtual fiducial markers determined using a velocity of imaging system coordinates of the virtual fiducial markers.

6. The medical system of claim 4, wherein the medical system further comprises a subject mounted gyroscope configured for providing gyroscope data descriptive of subject motion, wherein execution of the machine executable instructions further causes the computational system to:
repeatedly receive the gyroscope data from the subject mounted gyroscope;
repeatedly determine a subject acceleration from the gyroscope data;
repeatedly calculate a predicted virtual fiducial marker velocity using the subject acceleration; and
repeatedly calculate a predicted virtual fiducial marker location using most recent imaging system coordinates of the virtual fiducial markers and the predicted virtual fiducial marker velocity.

7. The medical system of claim 1, wherein the medical system further comprises a display, wherein execution of the machine executable instructions further causes the computational system to:
receive the camera system coordinates of the set of virtual fiducial markers at a beginning of the acquisition of the medical imaging data;
calculate a position of an initial subject location indicator using the camera system coordinates of the set of virtual fiducial markers at a beginning of the acquisition;
render the initial subject location indicator on the display persistently;
repeatedly calculate a position of a current location indicator using the camera system coordinates of the set of virtual fiducial markers; and
repeatedly render the current subject location indicator on the display.

8. The medical system of claim 7, wherein any one of the following:
the initial subject location indicator is a rendering of the set of virtual fiducial markers positioned using the output camera system coordinates at the beginning of the acquisition superimposed on the subject image, wherein the current subject location indicator is a rendering of the set of virtual fiducial markers positioned using the camera system coordinates superimposed on the subject image; and the initial subject location indicator is a first object positioned using a combination of the set of virtual fiducial markers in the camera system coordinates at the beginning of the acquisition, wherein the current subject location indicator is a second object positioned using a combination of the set of virtual fiducial markers in the camera system coordinates.

9. The medical system of claim 1, wherein the medical imaging data is acquired in portions, wherein execution of the machine executable instructions further causes the computational system to correct each of the portions of the medical imaging data using the camera system coordinates of the virtual fiducial markers at the time each of the portions of the medical imaging data was acquired.

10. The medical system of claim 9, wherein the correction to the portions of the medical imaging data are corrected using any one of the following methods: by performing a rigid body rotation and/or translation, and using a medical image data correcting neural network configured to output corrected medical imaging data in response to receiving one of the portions of medical imaging data and the output coordinates of the virtual fiducial markers at the time each of the portions of the medical imaging data was acquired.

11. The medical system of claim 1, wherein execution of the machine executable instructions further causes the computational system to reconstruct a clinical medical image from the medical imaging data.

12. The medical system of claim 11, wherein the medical system further comprises a radiotherapy system configured for irradiating a treatment zone, wherein the treatment zone is within the imaging zone, wherein execution of the machine executable instructions further causes the computational system to:
receive radiotherapy control commands configured to control the radiotherapy system to iridate the treatment zone;
register the imaging system coordinates of the virtual fiducial markers to the clinical medical image;
receive a location of the treatment zone in the clinical medical image; and
modify the radiotherapy control commands using the location of the treatment zone in the clinical medical image and the registration of the imaging system coordinates of the virtual fiducial markers to the clinical medical image.

13. The medical system of claim 1, wherein the medical imaging data is any one of the following: a magnetic resonance imaging system, a computed tomography system, a positron emission tomography system, a single photon emission tomography system, a combined magnetic resonance imaging system and positron emission tomography system, and a combined computed tomography system and positron emission tomography system.

14. A method of operating a medical system, wherein the medical imaging system is configured to acquire medical imaging data descriptive of a subject from an imaging zone, wherein the medical imaging system has an image system coordinate system, wherein the medical system further comprises a camera system configured to acquire a subject image of the subject during acquisition of the medical imaging data, wherein the camera system has a camera coordinate system, wherein the method comprises:
acquiring the medical imaging data by controlling the medical imaging system with medical imaging system commands;
repeatedly controlling the camera system to acquire the subject image during acquisition of the medical imaging data;
repeatedly receiving camera system coordinates of the virtual fiducial markers by inputting the subject image into the image marking neural network, wherein the image marking neural network is configured to receive an input image descriptive of a predetermined anatomical region of the subject, wherein the image marking neural network is further configured to output camera system coordinates of a set of virtual fiducial markers in the input image in response to receiving the input image; and
repeatedly providing imaging system coordinates of the virtual fiducial markers by repeatedly converting the camera system coordinates of the set of virtual fiducial markers to the provided imaging system coordinates of the virtual fiducial markers using a coordinate system mapping, wherein the coordinate system mapping is a mapping between the imaging system coordinate system and the camera coordinate system.

15. A computer program comprising machine executable instructions for execution by a computational system controlling a medical system, wherein the medical system comprises a medical imaging system is configured to acquire medical imaging data descriptive of a subject from an imaging zone, wherein the medical imaging system has an image system coordinate system, wherein the medical system further comprises a camera system configured to acquire a subject image of a subject during acquisition of the medical imaging data, wherein the camera system has a camera coordinate system, wherein execution of the machine executable instruction causes the computational system to:
acquire the medical imaging data by controlling the medical imaging system with medical imaging system commands;
repeatedly control the camera system to acquire the subject image during acquisition of the medical imaging data;
repeatedly receive camera system coordinates of the virtual fiducial markers by inputting the subject image into the image marking neural network, wherein the image marking neural network is configured to receive an input image descriptive of a predetermined anatomical region of a subject, wherein the image marking neural network is further configured to output camera system coordinates of a set of virtual fiducial markers in the input image in response to receiving the input image; and
repeatedly provide imaging system coordinates of the virtual fiducial markers by repeatedly converting the camera system coordinates of the set of virtual fiducial markers to the provided imaging system coordinates of the virtual fiducial markers using a coordinate system mapping (140), wherein the coordinate system mapping is a mapping between the imaging system coordinate system and the camera coordinate system.

* * * * *